US011405462B1

(12) United States Patent
Puchalski et al.

(10) Patent No.: US 11,405,462 B1
(45) Date of Patent: Aug. 2, 2022

(54) SYSTEMS, METHODS, AND COMPUTER PROGRAM PRODUCTS FOR TESTING OF CLOUD AND ONBOARD AUTONOMOUS VEHICLE SYSTEMS

(71) Applicant: Argo AI, LLC, Pittsburgh, PA (US)

(72) Inventors: Matthew Puchalski, Pittsburgh, PA (US); Scott Anthony Plant, San Jose, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

(21) Appl. No.: 17/376,643

(22) Filed: Jul. 15, 2021

(51) Int. Cl.
*H04L 67/12* (2022.01)
*H04L 9/40* (2022.01)
*H04L 43/50* (2022.01)
*H04L 43/08* (2022.01)

(52) U.S. Cl.
CPC ............. *H04L 67/12* (2013.01); *H04L 43/50* (2013.01); *H04L 63/123* (2013.01); *H04L 63/1425* (2013.01); *H04L 63/1433* (2013.01); *H04L 43/08* (2013.01); *H04L 63/20* (2013.01)

(58) Field of Classification Search
CPC ..... H04L 67/12; H04L 43/50; H04L 63/1425; H04L 63/1433; H04L 43/08
See application file for complete search history.

(56) References Cited

U.S. PATENT DOCUMENTS

| 9,307,015 | B1 | 4/2016 | Bauer et al. |
| 2018/0182187 | A1 | 6/2018 | Tong et al. |
| 2018/0189344 | A1 | 7/2018 | Akwule et al. |
| 2019/0171208 | A1* | 6/2019 | Magalhães de Matos ................. G05D 1/0027 |
| 2021/0118081 | A1* | 4/2021 | Jha ....................... G06Q 20/389 |

* cited by examiner

*Primary Examiner* — Tonia L Dollinger
*Assistant Examiner* — Linh T. Nguyen
(74) *Attorney, Agent, or Firm* — The Webb Law Firm

(57) ABSTRACT

Provided are systems, methods, and computer program products for monitoring, testing, or debugging transportation services, generating or transmitting an initiating message from a global manager cloud to an external service cloud, to invoke a transportation as a service (TaaS) message from external service clouds that comprise confirmation, also including generating or transmitting a simulated message from the global manager cloud to mirror the TaaS message, or a portion, transmitted on a TaaS link from the external service cloud to the on-vehicle modem, determining, a confidence threshold for a capability or security of the TaaS link, validating AV service data sent from the global manager cloud to a TaaS component in an on-vehicle black box of the autonomous vehicle system, validating AV compute data sent from the autonomous vehicle system to the TaaS component in the on-vehicle black box, validating TaaS message data received from the external service cloud.

20 Claims, 4 Drawing Sheets

SYSTEMS, METHODS, AND COMPUTER PROGRAM PRODUCTS FOR TESTING OF CLOUD AND ONBOARD AUTONOMOUS VEHICLE SYSTEMS

BACKGROUND

Field

This disclosure relates generally to transportation as a service, mobility services and, in some non-limiting embodiments or aspects, to systems, methods, and computer program products for testing, debugging, or monitoring operations of external cloud services that provide an autonomy or self-driving service, logging information for on-vehicle compute, devices, sensors, actuators, user experience devices, storage, and route planning in a hybrid cloud infrastructure.

Description of Related Art

Mobility presently involves the connection of vehicles with desired services, and other vehicles, to facilitate driving. As the popularity of connected mobility increases, the integration of systems that reside inside and outside of a vehicle are increasing. Mobility systems can be connected remotely via a cloud host to vehicles and provide accessible services that can improve the travel experience.

Many automobile original equipment manufacturers (OEMs) are becoming integrators of software features and functions. Autonomous vehicle development is supported by OEMs and other third party partners for available services. Many OEMs and cloud service providers are partnering with autonomous vehicle makers to provide connected mobility back-end features, smart assistance, ride hailing services, platforms for on-vehicle user experience, machine learning/intelligence, door unlock mechanisms, and other connected mobility features. Integration of such mobility is becoming influential over the core driving functions and the driver experience.

The connection between vehicles and the environment, back-end clouds, partner clouds, and service clouds will shape and enhance the future of autonomous driving. It is now becoming common for electric vehicles, autonomy, and connected mobility to use a mix of connections to build an environment based on mobility services available through public cloud infrastructure and private cloud infrastructure.

Cloud infrastructure refers to the components needed for cloud computing, which includes hardware, abstracted resources, storage, and network resources. The cloud infrastructure includes any of the tools needed to build a cloud. In order to host cloud services and applications, cloud infrastructure is needed. Cloud hosting makes applications and websites accessible using cloud resources. Unlike traditional hosting, cloud hosting solutions are not deployed on a single server. Instead, a cloud architecture of connected virtual and physical cloud servers hosts the application or website, ensuring greater flexibility and scalability. The cloud architecture involves individual technologies that are integrated together creating cloud computing environments that form connected environments and components, including hardware, virtual resources, networks, operating systems, middleware, automation, management, and containers.

Cloud integration, the system of tools and technologies, are connected via various applications, systems, repositories, and information technology environments for the real-time exchange of data and processes. Once combined, cloud data and integrated cloud services can then be accessed by multiple devices over a network or through data pipelines, the internet, or private connections.

Cloud data integration involves integrating data used by the many disparate systems, between or within public or private clouds, or between cloud-based and on-vehicle systems. However, the goal of unified data stores that can be accessed efficiently and transparently by all relevant users and applications can be elusive. As such, the integration of cloud technology presents issues, especially when implementing new technology, such as, connected vehicles, autonomous driving, and connectivity platforms. Integration of new on-vehicle features and complex cloud systems into an already complex environment, such as, those used for the development of autonomous vehicles, can make it difficult to discover the root cause of issues, especially when ultimate control of the end-result of developing a fully integrated product often relies with a single party that does not have control or ownership over the infinitude of various hardware and software environments used for providing mobility services.

SUMMARY

Accordingly, disclosed are improved computer-implemented systems, methods, and computer program products for testing of cloud and on-vehicle autonomous vehicle systems.

According to non-limiting embodiments or aspects, provided is a computer-implemented method of testing a connected TaaS component in an autonomous vehicle system, comprising: transmitting an initiating message from a global manager cloud to an external service cloud via an on-vehicle modem to invoke a transportation as a service (TaaS) message provided by the external service cloud via a TaaS link to an on-vehicle modem, including confirmation data of the global manager cloud for the TaaS message as a part of a TaaS update to an on-vehicle TaaS component of an on-vehicle black-box processor; transmitting a simulated message from the global manager cloud, the simulated message programmed to mirror the TaaS message transmitted on a TaaS link from the external service cloud to the on-vehicle modem; determining, after the simulated message is received in an autonomous vehicle system, a confidence threshold for a capability or security of the TaaS link, comprising: eliminating one or more health condition associated with a TaaS communication link based on a traversal of the simulated message; validating, by the on-vehicle modem, AV service data sent from the global manager cloud to a TaaS component in an on-vehicle black box of the autonomous vehicle system; validating, by the on-vehicle modem, AV compute data sent from the autonomous vehicle system to the TaaS component in the on-vehicle black box; and validating, by the autonomous vehicle system, TaaS message data received from the external service cloud, wherein validating is based on the confirmation data included in the TaaS message data from the initiating message; and updating a TaaS component in the autonomous vehicle system based on a problem in the TaaS component of the on-vehicle black box.

In some non-limiting embodiments or aspects, the computer-implemented method further includes determining a confidence threshold, further comprises: determining that a communication interface is causing issues in the TaaS component comprising signal interference, signal jitter, signal timing, message integrity, configuration issues, or environmental concerns; and controlling the on-vehicle black box to send a valid updated message.

In some non-limiting embodiments or aspects, the computer-implemented method further includes the TaaS comprising at least one of a diagnostic service, location service, fleet service, routing service, device service, user experience service, or telematics service.

In some non-limiting embodiments or aspects, the computer-implemented method further includes that the external service cloud information is hidden or secret while transmitting between the external service cloud and the on-vehicle black box, and wherein validating TaaS message data comprises at least one of: comparing confirmation data to confirmation data sent to the external service cloud in the initiating message, displaying the confirmation data to a diagnostic display device, displaying the confirmation data in a device of the autonomous vehicle system during a testing procedure, automatically logging non-conforming confirmation data, or automatically comparing confirmation data to the initiating message and transmitting a signal when the confirmation data does not conform.

In some non-limiting embodiments or aspects, the computer-implemented method further includes that updating a TaaS component further comprises debugging one or more software bugs, one or more hardware malfunctions, or one or more networking issues inside of one or more external service clouds or one or more on-vehicle cloud systems.

In some non-limiting embodiments or aspects, the computer-implemented method further includes that validating an on-vehicle TaaS component comprises: displaying test data on an external situational awareness module, including route information provided by the global manager cloud, passenger fare information from an external service cloud, and real-time sensor information from the autonomous vehicle system, wherein the test data provides confirmation of message content from the global manager cloud, the external service cloud, and the autonomous vehicle system.

In some non-limiting embodiments or aspects, the computer-implemented method further includes that the on-vehicle modem comprises a TaaS gateway for receiving, routing, and testing TaaS messages, the TaaS gateway comprising a software extension, software injection, or customized software library, including instructions executable in the TaaS gateway when matching with an indication of an incoming TaaS message, instructions programmed to perform an action, to send a message, or perform a remote command back to the external service cloud or global manager cloud, wherein the TaaS gateway automatically executes instructions and transfers diagnostic information for a received TaaS message including vehicle metrics, communication metrics, sensor metrics, or travel information.

In some non-limiting embodiments or aspects, the computer-implemented method further includes that the on-vehicle modem receives a TaaS message to control a TaaS gateway to handle a TaaS message, wherein the on-vehicle modem may generate or transmit a message to the global manager cloud indicating to perform predictive diagnostics processing on one or more messages sent to a vehicle fleet after aggregating messages across a fleet associated with a specific software bug and/or known issue, and further wherein, in response, the on-vehicle modem receives a diagnostic message including instructions created by the global manager cloud or external service cloud to trigger one or more processors of a TaaS gateway for creation or execution of a specific injection rule associated with the TaaS message.

In some non-limiting embodiments or aspects, the computer-implemented method further includes that the TaaS gateway transmits a TaaS outgoing message to other vehicles or global manager cloud when a potential diagnostic problem for a certain device occurs based on a specified condition, including at least one of a certain geographical location, a specified time, a specified vehicle condition, a specified network, and/or the like, wherein transmitting the TaaS outgoing message comprises: notifying other vehicles that there are potential diagnostic problem for a certain device that occurs at a certain geographical location, or notifying other vehicles when a confidence threshold reaches a predetermined level; generating a message or command based on received information; and transmitting the message or command to the global manager cloud that is configured to act on the message, or alternatively, to transmit a message directly to the autonomous vehicle system, an edge processor for diagnosing a TaaS component, or an external service cloud.

In some non-limiting embodiments or aspects, the computer-implemented method further includes that the on-vehicle modem receives information from the external service cloud, the global manager cloud, a vehicle control system, a processor of a TaaS gateway, or alternatively, an edge processor that may be activated by the global manager cloud to process TaaS messages, global manager messages, or autonomous vehicle system messages.

According to non-limiting embodiments or aspects, provided is a cloud and autonomous vehicle compute testing system, comprising one or more processors programmed and/or configured to: transmit an initiating message from a global manager cloud to an external service cloud via an on-vehicle modem, the initiating message configured to invoke a transportation as a service (TaaS) message provided by the external service cloud via a TaaS link to an on-vehicle modem, including confirmation data of the global manager cloud for a TaaS message as a part of a TaaS update to an on-vehicle TaaS component of an on-vehicle black-box processor; transmit a simulated message from the global manager cloud, the simulated message programmed to mirror the TaaS message transmitted on a TaaS link from the external service cloud to the on-vehicle modem; determine, after the simulated message is received in an autonomous vehicle system, a confidence threshold for a capability or security of the TaaS link by eliminating one or more health condition associated with a TaaS communication link based on a traversal by the simulated message; validate, by the on-vehicle modem, AV service data sent from the global manager cloud to a TaaS component in an on-vehicle black box of the autonomous vehicle system; validate, by the on-vehicle modem, AV compute data sent from the autonomous vehicle system to the TaaS component in the on-vehicle black box; validate, by the autonomous vehicle system, TaaS message data received from the external service cloud, wherein validating is based on the confirmation data included in the TaaS message data from the initiating message; and update a TaaS component in the autonomous vehicle system based on a problem in the TaaS component of the on-vehicle black box.

According to non-limiting embodiments or aspects, a computer program product for cloud and autonomous vehicle compute testing, comprising at least one non-transitory computer-readable medium including one or more instructions that, when executed by at least one processor, cause the one or more processors to: transmit an initiating message from a global manager cloud to an external service cloud to invoke a transportation as a service (TaaS) message provided by the external service cloud via a TaaS link to an on-vehicle modem, comprising confirmation data of the global manager cloud that can be included in a TaaS message as a part of a TaaS update to an on-vehicle TaaS component of an on-vehicle black-box processor; transmit a simulated message from the global manager cloud, the simulated message programmed to mirror the TaaS message transmitted on a TaaS link from the external service cloud to the on-vehicle modem; determine, after the simulated message is received in an autonomous vehicle system, a confidence threshold for a capability or security of the TaaS link by eliminating one or more health condition associated with a TaaS communication link based on a traversal by the simulated message; validate, by the on-vehicle modem, AV service data sent from the global manager cloud to a TaaS component in an on-vehicle black box of the autonomous vehicle system; validate, by the on-vehicle modem, AV compute data sent from the autonomous vehicle system to the TaaS component in the on-vehicle black box; validate, by the autonomous vehicle system, TaaS message data received from the external service cloud, wherein validating is based on the confirmation data included in the TaaS message data from the initiating message; and update a TaaS component in the autonomous vehicle system based on a problem in the TaaS component of the on-vehicle black box.

Further non-limiting embodiments or aspects are set forth in the following numbered clauses:

Clause 1. A computer-implemented method of testing a connected TaaS component in an autonomous vehicle system, comprising: transmitting an initiating message from a global manager cloud to an external service cloud via an on-vehicle modem to invoke a transportation as a service (TaaS) message provided by the external service cloud via a TaaS link to an on-vehicle modem, including confirmation data of the global manager cloud for the TaaS message as a part of a TaaS update to an on-vehicle TaaS component of an on-vehicle black-box processor; transmitting a simulated message from the global manager cloud, the simulated message programmed to mirror the TaaS message transmitted on a TaaS link from the external service cloud to the on-vehicle modem; determining, after the simulated message is received in an autonomous vehicle system, a confidence threshold for a capability or security of the TaaS link, comprising: eliminating one or more health condition associated with a TaaS communication link based on a traversal of the simulated message; validating, by the on-vehicle modem, AV service data sent from the global manager cloud to a TaaS component in an on-vehicle black box of the autonomous vehicle system; validating, by the on-vehicle modem, AV compute data sent from the autonomous vehicle system to the TaaS component in the on-vehicle black box; and validating, by the autonomous vehicle system, TaaS message data received from the external service cloud, wherein validating is based on the confirmation data included in the TaaS message data from the initiating message; and updating a TaaS component in the autonomous vehicle system based on a problem in the TaaS component of the on-vehicle black box.

Clause 2. The computer-implemented method of clause 1, wherein determining a confidence threshold, further comprises: determining that a communication interface is causing issues in the TaaS component comprising signal interference, signal jitter, signal timing, message integrity, configuration issues, or environmental concerns; and controlling the on-vehicle black box to send a valid updated message.

Clause 3: The computer-implemented method of clauses 1 or 2, wherein the TaaS comprises at least one of a diagnostic service, location service, fleet service, routing service, or device service, user experience service, or telematics service.

Clause 4: The computer-implemented method of clauses 1-3, wherein external service cloud information is hidden or secret while transmitting between the external service cloud and the on-vehicle black box, and wherein validating TaaS message data comprises at least one of: comparing confirmation data to confirmation data sent to the external service cloud in the initiating message, displaying the confirmation data to a diagnostic display device, displaying the confirmation data in a device of the autonomous vehicle system during a testing procedure, automatically logging non-conforming confirmation data, or automatically comparing confirmation data to the initiating message and transmitting a signal when the confirmation data does not conform.

Clause 5: The computer-implemented method of clauses 1-4, wherein updating a TaaS component further comprises debugging one or more software bugs, one or more hardware malfunctions, or one or more networking issues inside of one or more external service clouds or one or more on-vehicle cloud systems.

Clause 6: The computer-implemented method of clauses 1-5, wherein validating an on-vehicle TaaS component comprises: displaying test data on an external situational awareness module, including route information provided by the global manager cloud, passenger fare information from an external service cloud, and real-time sensor information from the autonomous vehicle system, wherein the test data provides confirmation of message content from the global manager cloud, the external service cloud, and the autonomous vehicle system.

Clause 7: The computer-implemented method of clauses 1-6, wherein the on-vehicle modem comprises a TaaS gateway for receiving, routing, and testing TaaS messages, the TaaS gateway comprising a software extension, software injection, or customized software library, including instructions executable in the TaaS gateway when matching with an indication of an incoming TaaS message, instructions programmed to perform an action, to send a message, or perform a remote command back to the external service cloud or global manager cloud, wherein the TaaS gateway automatically execute instructions and transfers diagnostic information for a received TaaS message including vehicle metrics, communication metrics, sensor metrics, or travel information.

Clause 8: The computer-implemented method of clauses 1-7, wherein the on-vehicle modem receives a TaaS message to control a TaaS gateway to handle a TaaS message, wherein the on-vehicle modem may generate or transmit a message to the global manager cloud indicating to perform predictive diagnostics processing on one or more messages sent to a vehicle fleet after aggregating messages across a fleet associated with a specific software bug and/or known issue, and further wherein, in response, the on-vehicle modem receives a diagnostic message including instructions created by the global manager cloud or external service cloud to trigger one or more processors of a TaaS gateway for creation or execution of a specific injection rule associated with the TaaS message.

Clause 9: The computer-implemented method of clauses 1-8, wherein the TaaS gateway transmits a TaaS outgoing message to other vehicles or global manager cloud when a potential diagnostic problem for a certain device occurs based on a specified condition, including at least one of a certain geographical location, a specified time, a specified vehicle condition, a specified network, wherein transmitting the TaaS outgoing message comprises: notifying other vehicles that there are potential diagnostic problem for a certain device that occurs at a certain geographical location, or notifying other vehicles when a confidence threshold reaches a predetermined level; generating a message or command based on received information; and transmitting the message or command to the global manager cloud that is configured to act on the message, or alternatively, to transmit a message directly to the autonomous vehicle system, an edge processor for diagnosing a TaaS component, or an external service cloud.

Clause 10: The computer-implemented method of clauses 1-9, wherein the on-vehicle modem receives information from the external service cloud, the global manager cloud, a vehicle control system, a processor of a TaaS gateway, or alternatively, an edge processor that may be activated by the global manager cloud to process TaaS messages, global manager messages, or autonomous vehicle system messages.

Clause 11: A cloud and autonomous vehicle compute testing system, comprising: one or more processors programmed and/or configured to: transmit an initiating message from a global manager cloud to an external service cloud via an on-vehicle modem, the initiating message configured to invoke a transportation as a service (TaaS) message provided by the external service cloud via a TaaS link to an on-vehicle modem, including confirmation data of the global manager cloud for a TaaS message as a part of a TaaS update to an on-vehicle TaaS component of an on-vehicle black-box processor; transmit a simulated message from the global manager cloud, the simulated message programmed to mirror the TaaS message transmitted on a TaaS link from the external service cloud to the on-vehicle modem; determine, after the simulated message is received in an autonomous vehicle system, a confidence threshold for a capability or security of the TaaS link by eliminating one or more health condition associated with a TaaS communication link based on a traversal by the simulated message; validate, by the on-vehicle modem, AV service data sent from the global manager cloud to a TaaS component in an on-vehicle black box of the autonomous vehicle system; validate, by the on-vehicle modem, AV compute data sent from the autonomous vehicle system to the TaaS component in the on-vehicle black box; validate, by the autonomous vehicle system, TaaS message data received from the external service cloud, wherein validating is based on the confirmation data included in the TaaS message data from the initiating message; and update a TaaS component in the autonomous vehicle system based on a problem in the TaaS component of the on-vehicle black box.

Clause 12: The cloud and autonomous vehicle compute testing system of clause 11, wherein the one or more processors are further programmed and/or configured to determine a confidence threshold by: determining that a communication interface is causing issues in the TaaS component comprising signal interference, signal jitter, signal timing, message integrity, configuration issues, or environmental concerns; and controlling the on-vehicle black box to send a valid updated message.

Clause 13: The cloud and autonomous vehicle compute testing system of clauses 11 or 12, wherein the TaaS comprises at least one of a diagnostic service, location service, fleet service, routing service, or device service, user experience service, or telematics service.

Clause 14: The cloud and autonomous vehicle compute testing system of clauses 11-13, wherein external service cloud information is hidden or secret while transmitting between the external service cloud and the on-vehicle black box, and wherein validating TaaS message data comprises at least one of: comparing confirmation data to confirmation data sent to the external service cloud in the initiating message, displaying the confirmation data to a diagnostic display device, displaying the confirmation data in a device of the autonomous vehicle system during a testing procedure, automatically logging non-conforming confirmation data, or automatically comparing confirmation data to the initiating message and transmitting a signal when the confirmation data does not conform.

Clause 15: The cloud and autonomous vehicle compute testing system of clauses 11-14, the one or more processors are further programmed and/or configured to update a TaaS component by debugging one or more software bugs, one or more hardware malfunctions, or one or more networking issues inside of one or more external service clouds or one or more on-vehicle cloud systems.

Clause 16: The cloud and autonomous vehicle compute testing system of clauses 11-15, wherein validating an on-vehicle TaaS component comprises: displaying test data on an external situational awareness module, including route information provided by the global manager cloud, passenger fare information from an external service cloud, and real-time sensor information from the autonomous vehicle system, wherein the test data provides confirmation of message content from the global manager cloud, the external service cloud, and the autonomous vehicle system.

Clause 17: The cloud and autonomous vehicle compute testing system of clauses 11-16, wherein the on-vehicle modem comprises a TaaS gateway for receiving, routing, and testing TaaS messages, the TaaS gateway comprising a software extension, software injection, or customized software library, including instructions executable in the TaaS gateway when matching with an indication of an incoming TaaS message, instructions programmed to perform an action, to send a message, or perform a remote command back to the external service cloud or global manager cloud, wherein the TaaS gateway automatically executes instructions and transfers diagnostic information for a received TaaS message including vehicle metrics, communication metrics, sensor metrics, or travel information.

Clause 18: The cloud and autonomous vehicle compute testing system of clauses 11-17, wherein the on-vehicle modem receives a TaaS message to control a TaaS gateway to handle a TaaS message, wherein the on-vehicle modem may generate or transmit a message to the global manager cloud indicating to perform predictive diagnostics processing on one or more messages sent to a vehicle fleet after aggregating messages across a fleet associated with a specific software bug and/or known issue, and further wherein response, the on-vehicle modem receives a diagnostic message including instructions created by the global manager cloud or external service cloud to trigger one or more processors of a TaaS gateway for creation or execution of a specific injection rule associated with the TaaS message.

Clause 19: The cloud and autonomous vehicle compute testing system of clauses 11-18, wherein the TaaS gateway transmits a TaaS outgoing message to other vehicles or global manager cloud when a potential diagnostic problem for a certain device occurs based on a specified condition, including at least one of a certain geographical location, a specified time, a specified vehicle condition, or a specified network, and wherein transmitting the TaaS outgoing message comprises: notifying other vehicles that there are potential diagnostic problems for a certain device that occurs at a certain geographical location, or notifying other vehicles when a confidence threshold reaches a predetermined level; generating a message or command based on received information; and transmitting the message or command to the global manager cloud that is configured to act on the message, or alternatively, to transmit a message directly to the autonomous vehicle system, an edge processor for diagnosing a TaaS component, or an external service cloud.

Clause 20: A computer program product for cloud and autonomous vehicle compute testing, comprising at least one non-transitory computer-readable medium including one or more instructions that, when executed by at least one processor, cause the one or more processors to: transmit an initiating message from a global manager cloud to an external service cloud to invoke a transportation as a service (TaaS) message provided by the external service cloud via a TaaS link to an on-vehicle modem, comprising confirmation data of the global manager cloud that can be included in a TaaS message as a part of a TaaS update to an on-vehicle TaaS component of an on-vehicle black-box processor; transmit a simulated message from the global manager cloud, the simulated message programmed to mirror the TaaS message transmitted on a TaaS link from the external service cloud to the on-vehicle modem; determine, after the simulated message is received in an autonomous vehicle system, a confidence threshold for a capability or security of the TaaS link by eliminating one or more health condition associated with a TaaS communication link based on a traversal by the simulated message; validate, by the on-vehicle modem, AV service data sent from the global manager cloud to a TaaS component in an on-vehicle black box of the autonomous vehicle system; validate, by the on-vehicle modem, AV compute data sent from the autonomous vehicle system to the TaaS component in the on-vehicle black box; validate, by the autonomous vehicle system, TaaS message data received from the external service cloud, wherein validating is based on the confirmation data included in the TaaS message data from the initiating message; and update, a TaaS component in the autonomous vehicle system based on a problem in the TaaS component of the on-vehicle black box.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
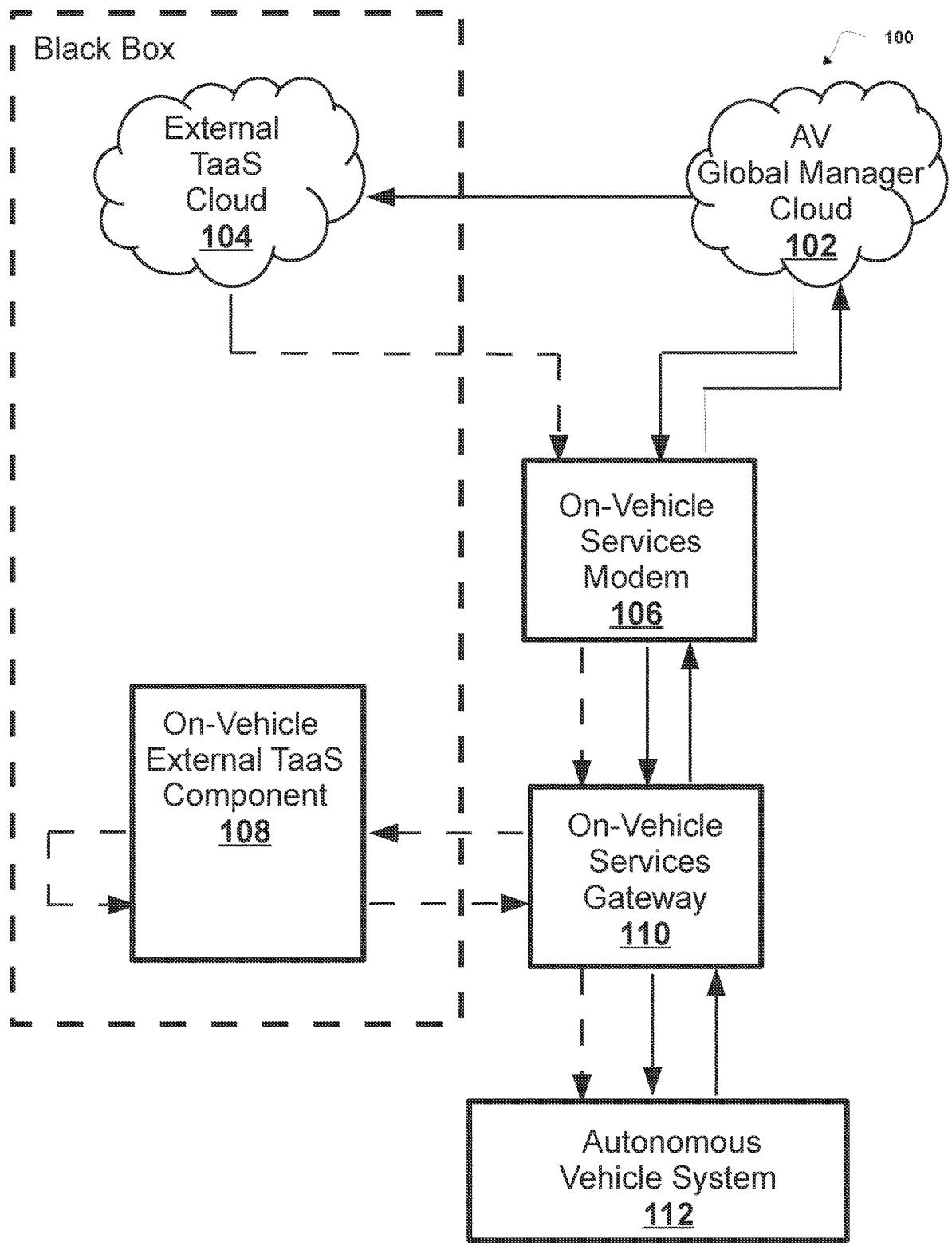
FIG. 1 is a diagram of non-limiting embodiments or aspects of a service cloud environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position, such as, "vertical" and "horizontal", or "front" and "rear", when used, are intended to be relative to each other and need not be absolute, and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms, such as, "first" and "second" are used to modify a noun, such use is simply intended to distinguish one item from another, and is not intended to require a sequential order unless specifically stated.

In some non-limiting embodiments or aspects, one or more aspects associated with testing of cloud systems and autonomous vehicle systems are described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as, a processor, a display, a memory, an input device, a network interface, and/or the like. A computing device may be included in a device on-vehicle an autonomous vehicle (AV). As an example, a computing device may include an on-vehicle specialized computer (e.g., a sensor, a controller, a data store, a communication interface, a display interface, etc.), a mobile device (e.g., a smartphone, standard cellular phone, or integrated cellular device,), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate a maneuver by an AV, such as, one or more remote devices communicating with an AV. In some non-limiting embodiments or aspects, a client device may include a computing device configured to communicate with one or more networks and/or facilitate vehicle movement, such as, but not limited to, one or more vehicle computers, one or more mobile devices, and/or other like devices.

As used herein, the term "server" may refer to or include one or more computing devices that are operated by or facilitate communication and processing for multiple parties in a network environment, such as, the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices, such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

An "electronic device" or a "computing device" refers to a device that includes a processor and a memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility," and the like each refer to a non-transitory device on which computer-readable data, programming instructions, or both are stored. Except where specifically stated otherwise, the terms "memory," "memory device," "data store," "data storage facility," and the like are intended to include single device embodiments, embodiments in which multiple memory devices together or collectively store a set of data or instructions, as well as, individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" (AV) is a vehicle having a processor, programming instructions, and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms "trajectory" and "trajectories" may refer to a path (e.g., a path through a geospatial area, etc.) with positions of the AV along the path with respect to time, where a "path" generally implies a lack of temporal information, one or more paths for navigating an AV in a roadway for controlling travel of the AV on the roadway. A trajectory may be associated with a map of a geographic location including the roadway. In such an example, the path may traverse a roadway, an intersection, or other connection, or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, "map data" includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some embodiments or aspects, a map of a geographic location includes one or more routes (e.g., nominal route, driving route, etc.) that include one or more roadways. According to some non-limiting embodiments or aspects, map data associated with a map of the geographic location associates the one or more roadways with an indication of whether an AV can travel on that roadway.

As used herein, a "road" refers to a paved or otherwise improved path between two places that allows for travel by a vehicle (e.g., autonomous vehicle). Additionally or alternatively, a road includes a roadway and a sidewalk in proximity to (e.g., adjacent, near, next to, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle, or other vehicle may travel, such as, a crosswalk, a bicycle lane (e.g., a lane in which a bicycle travels), a mass transit lane (e.g., a lane in which a bus may travel), and/or the like. According to some non-limiting embodiments or aspects, a roadway is connected to another roadway to form a road network, for example, a lane of a roadway is connected to another lane of the roadway and/or a lane of the roadway is connected to a lane of another roadway. In some non-limiting embodiments or aspects, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network, and may include an evaluation of any number of maneuvers (e.g., a simple maneuver, a complex maneuver, etc.), such as, a maneuver involving certain driving conditions, such as, dense traffic, where successfully completing a lane change may require a complex maneuver, like speeding up, slowing down, stopping, or abruptly turning, for example, to steer into a narrow gap between vehicles (or other objects as detailed herein) in a destination lane. Additionally, in-lane maneuvers may also involve an evaluation of any number of maneuvers, such as, a maneuver to traverse a lane split, an intersection (e.g., a three-leg, a four-leg, a multileg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as, a maneuver based on a current traffic speed of objects in the roadway, current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as, a maneuver to avoid an object in proximity to a road, such as, structures (e.g., a building, a rest stop, a toll booth, a bridge, etc.), traffic control objects (e.g., lane markings, traffic signs, traffic lights, lampposts, curbs of the road, a gully, a pipeline, an aqueduct, a speedbump, a speed depression, etc.), a lane of a roadway (e.g., a parking lane, a turning lane, a bicycle lane, etc.), a crosswalk, a bicycle lane (e.g., a lane in which a bicycle travels), a mass transit lane (e.g. a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

As used herein, "sensor data" includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle) of a number of points (e.g., a point cloud) that correspond to objects that have reflected a ranging laser of one or more mapping vehicles at the geographic location. As an example, sensor data may include LiDAR point cloud data that represents objects in the roadway, such as, other vehicles, pedestrians, cones, debris, etc.

As used herein, a "hybrid cloud" (e.g., a heterogeneous cloud) is defined as a cloud solution that combines a private cloud with one or more public cloud services, with proprietary software enabling communication between each distinct service. A hybrid cloud strategy provides flexibility by moving workloads between cloud solutions as needed.

The use of multiple cloud services from separate cloud providers on autonomous vehicles has certain shortcomings. Accordingly, there may be no way for organizations to integrate, monitor, and debug multiple public clouds, implement hybrid cloud environments, or to integrate legacy on-vehicle systems with cloud connections. Integration of new on-vehicle features and complex cloud systems into an already complex environment, such as, a developmental environment for a self-driving car, can make it difficult or impossible to determine the root cause of bugs and other issues, even when controlling the end-result of development for a fully integrated product, as developers do not have control and cannot obtain information about the various hardware and software services.

In existing systems, there may be no centralized location to obtain information needed to diagnose single issues or root cause while employing on-vehicle devices using heterogeneous cloud infrastructure. Separate private logging services may not be useful, as existing systems use different formats and/or have different levels of information, making correlation with a bug or determination of issues among different cloud services difficult or impossible. Additionally, if an on-vehicle service is part of or otherwise depends on the operation of a monitored device (e.g., a service running on-vehicle that also executes an application for a service provided by the cloud infrastructure), information may not be available from existing private cloud services or may not be available timely because of failure, link issues, inoperability, or incompatibility, limiting the ability to obtain information that is needed for root cause analysis.

In other existing systems, black box subsystems may be used in a vehicle compute infrastructure having network-connected hardware computing devices including vehicle compute, storage arrays, and network switches, where the black box subsystems (e.g., component) execute one or more applications of a cloud infrastructure service, the applications engaging in application data storage, accesses with the storage arrays, and engaging in application network data transfers via direct connect to the network switches. In such existing systems, monitoring of black box components may only determine behavior visible outside the black box.

In still other existing systems, when mobility clouds are used (e.g., service cloud focused on solving a discrete mobility issue, etc.), some service clouds may be open or public, or, alternatively, some closed or private, and therefore determining a root cause of performance problems may be difficult. In existing systems, if the problem is actually caused by one of the supporting service clouds (e.g., an infrastructure of the service cloud) that is private, closed, or only externally visible, or connected to a private or closed system, very little information may be known about what takes place internally. For example, determining a problem for a public cloud service in question, that is hosted on a virtualization platform hosted on a private cloud, which is overcommitted in terms of resources, resulting in slower processing, may be impossible, if the virtualization data is only visible internally (e.g., in the private cloud and not shared). In such a scenario, the host administrator is the only one who can determine the bottleneck, since information about the virtualization is not available externally and determining what is causing a bottleneck (e.g., slow in processing) is impossible, because in such a case, the host administrator has no visibility into the performance of the infrastructure for the service clouds that are affecting performance. Thus, in existing systems using a black box subsystem, implemented on-vehicle, the limitations on the visibility into data while transmitting between clouds may cause inefficiencies and inaccuracies in an on-vehicle system, and may be time-consuming to debug, involve external support, and/or be error-prone.

Provided are improved systems, methods, and computer program products for black box testing of cloud and on-vehicle autonomous vehicle systems. In some non-limiting embodiments or aspects, a system, such as, an on-vehicle modem, an on-vehicle gateway, a vehicle service cloud, or a vehicle compute, including at least one processor programmed or configured to test, diagnose, or debug a connected transportation as a service (TaaS) component in an autonomous vehicle system, including transmitting an initiating message from a global manager cloud to an external service cloud via an on-vehicle modem, the initiating message configured to invoke a TaaS message provided by the external service cloud via a TaaS link to an on-vehicle modem, wherein the initiating message comprises confirmation data of the global manager cloud that will be included in a TaaS message as a part of a TaaS update to an on-vehicle TaaS component of an on-vehicle black-box processor, transmitting a simulated message from the global manager cloud, the simulated message programmed to mirror the TaaS message transmitted on a TaaS link from the external service cloud to the on-vehicle modem, determining, after the simulated message is received in an autonomous vehicle system, a confidence threshold for a capability or security of the TaaS link by eliminating one or more health condition associated with a TaaS communication link based on a traversal of the simulated message, validating, by the on-vehicle modem, AV service data sent from the global manager cloud to a TaaS component in an on-vehicle black box of the autonomous vehicle system, validating, by the on-vehicle modem, AV compute data sent from the autonomous vehicle system to the TaaS component in the on-vehicle black box, validating, by the autonomous vehicle system, TaaS message data received from the external service cloud, wherein validating is based on the confirmation data included in the TaaS message data from the initiating message, and updating, a TaaS component, in the autonomous vehicle system based on a problem in the TaaS component of the on-vehicle black box.

According to the systems, methods, and computer program products described herein, the use of multiple cloud services from separate cloud providers on autonomous vehicles can be more efficiently and accurately monitored and debugged to determine and correct an error. In this way, organizations may integrate, monitor, and debug multiple public clouds, implement hybrid cloud environments, or integrate legacy on-vehicle systems with cloud connections. Integration of new on-vehicle features and complex cloud systems into an already complex environment, such as, a developmental environment for a self-driving car, can be made while still enabling a determination of a root cause of bugs and other issues, based on more efficiently and accurately utilizing systems to realize the end-result of development for a fully integrated product.

In this way, it is possible to operate a centralized location to obtain information needed to diagnose both discrete and singular issues and a root cause of a systemic issue while employing on-vehicle devices using heterogeneous cloud infrastructure. Centralized logging services may be provided that can use different formats and/or have different levels of information and correlate a bug with determination of issues among different cloud services in an efficient and timely manner. Additionally, if an on-vehicle service is part of or otherwise depends on the operation of a monitored device or a service running on-vehicle that also executes an application for a service provided by the cloud infrastructure, confirmation information may be made available from existing private cloud services via a pass through from a centrally located service provided by a global manager cloud.

In some non-limiting embodiments or aspects, black box subsystems may be used in a vehicle compute infrastructure having network-connected hardware computing devices including vehicle compute, storage arrays, and network switches, where the black box subsystems (e.g., components) can execute one or more applications of a cloud infrastructure service, the applications engaging in application data storage, accesses with the storage arrays, and engaging in application network data transfers via direct connect to the network switches, all while central monitoring of black box components are provided with capability to predict behavior of a black box, based on behavior or characteristics available from systems visible outside the black box.

Still further, in some non-limiting embodiments or aspects, a service provided by a global manager cloud focused on solving a discrete mobility issue is provided so that a service cloud may be combined, in any combination with a closed or private cloud service, while still providing a confirmation of a black box software function or data that can be used for determining a root cause of performance problems. In this way, if a bug or problem is actually caused by one of a supporting service cloud (e.g., an infrastructure of the service cloud) that is private, closed or only externally visible, or connected to a private or closed system, information may be provided to more accurately or efficiently determine a root cause. Thus, in some non-limiting embodiments or aspects, one or more systems of the global manager provides timely and accurate information to infer characteristics about a black box subsystem, on-vehicle modem, on-vehicle gateway, or vehicle computer with increased visibility into data transmitting between clouds and transmitting between one or more clouds and an on-vehicle systems.

Referring now to FIG. 1, provided is an exemplary service cloud and autonomous vehicle (AV) global manager environment 100 in which devices, systems, and/or methods, described herein, may be implemented in a combination of cloud services and on-vehicle black box test methods. According to some non-limiting embodiments or aspects, environment 100 includes AV global manager cloud 102, external TaaS cloud 104, on-vehicle services modem 106, on-vehicle external TaaS components 108, on-vehicle services gateway 110, and on-vehicle autonomous vehicle system 112. Environment 100 can be used to control an aspect of an autonomous vehicle.

In some non-limiting embodiments or aspects, AV global manager cloud 102 communicates directly or indirectly with external TaaS cloud 104 which resides in the black box. For example, AV global manager cloud 102 may communicate with external TaaS cloud 104 for the purpose of initiating a service cloud to AV exchange (e.g., a message or data exchanged between external TaaS cloud 104 and on-vehicle services modem 106), which can then include further actions or messages downstream, such as, in on-vehicle external TaaS component 108 and on-vehicle autonomous vehicle system 112.

In addition to initiating a communication, AV global manager cloud 102 controls the contents of a signal (e.g., a message, a communication, a request, etc.) that is transmitted to external TaaS cloud 104. The signal may comprise data or information that is configured to satisfy a communication protocol (e.g., a proprietary protocol, an open protocol, etc.) associated with a specified cloud services of external TaaS cloud 104. In some non-limiting embodiments or aspects, the specified cloud service corresponds with one or more of on-vehicle external TaaS components 108. The signal that is transmitted by AV global manager cloud 102, in some non-limiting embodiments or aspects, may also include transmission of a portion including confirmation information, such as, for example, vehicle data or other data that can be used by the autonomous vehicle system, or information associated with the specified cloud service that can be used on board the AV for validating a TaaS message, and which is transmitted to external TaaS cloud 104 so that it can be transmitted downstream (e.g., in or toward the latter stages of a process) to be used for a validation and/or to debug a vehicle health issue related to a service provided by external TaaS cloud 104 (e.g., one or more services of TaaS cloud 104, etc.) In some non-limiting embodiments or aspects, AV global manager cloud 102 may transmit a different portion for validation to each separate TaaS cloud, in an example where more than one TaaS cloud exists, or alternatively, may use the same confirmation information across multiple TaaS clouds.

It should be noted that external TaaS cloud 104 may provide a single cloud service, which is tailored to control an aspect of the AV, or alternatively, multiple cloud services, which may be provided by a single cloud (e.g., external TaaS cloud 104). In an example where multiple services are provided, AV global manager cloud 102 may have multiple different specified protocols corresponding to the multiple different cloud services, each specified protocol initiating a specified cloud service. In other examples, the multiple different cloud services may also be provided by multiple different and separately controlled external TaaS clouds 104.

In some non-limiting embodiments or aspects, an example cloud service may utilize a number of components for testing software and devices of autonomous vehicle system 112 (e.g., a partner situational awareness module, etc.), such as, for example, route information provided by the AV cloud (e.g., AV global manager cloud 102), passenger fare information from the partner cloud (e.g., TaaS cloud 104), and real-time sensor information from the on-vehicle compute (e.g., on-vehicle autonomous vehicle system 112).

In some non-limiting embodiments or aspects, AV global manager cloud 102 initiates the cloud to vehicle exchange (e.g., a message and data exchange between external TaaS cloud 104, on-vehicle services modem 106, and on-vehicle autonomous vehicle system 112) by transmitting the signal to external TaaS cloud 104. The signal is then received, read, and acted upon by external TaaS cloud 104 within the black box shown in FIG. 1.

The received signal is then communicated by external TaaS cloud 104 to on-vehicle external TaaS component 108 which also resides in the black box, however, one of skill in the art would understand that this may be the same or a different black box. Such communications from external TaaS cloud 104 are intended for and may ultimately control an aspect (e.g., one or more sensors, one or more actuators, one or more components, etc.) of on-vehicle autonomous vehicle system 112. The message initiating the transmission, originally from AV global manager cloud 102, includes information that can be used to confirm at least a portion of the message transmitted to on-vehicle autonomous vehicle system 112 from external TaaS cloud 104.

The signal communicated by external TaaS cloud 104 communicated to on-vehicle external TaaS component 108 is initially received by on-vehicle services modem 106. On-vehicle services modem 106 forwards the signal to on-vehicle services gateway 110 for further processing and routing. Before forwarding, or alternatively, before routing, on-vehicle services modem 106 or on-vehicle services gateway 110 may determine (e.g., using an edge processor or program instructions to find, store, or perform other processing, etc.) and record the confirmation portion of the signal. In some examples, the confirmation portion of the signal is already known and/or recorded in AV global manager cloud 102, such as, in a database or a secure software module, or may be transmitted from AV global manager cloud 102 to on-vehicle autonomous vehicle system 112, where it can be stored or used for validation. Such transmission may occur before the TaaS message arrives from external TaaS cloud 104 (e.g., TaaS service cloud, etc.).

In some non-limiting embodiments or aspects, the signal is then transmitted or communicated by external TaaS cloud 104 to on-vehicle external TaaS components 108, which also reside in the black box (e.g., the second black box). The second black box includes the collection of on-vehicle partner components (e.g., on-vehicle external TaaS components 108).

AV global manager cloud 102 is also programmed or configured to communicate directly or indirectly with on-vehicle services modem 106. AV global manager cloud 102 accumulates data, or alternatively, enhances information already known, about the operations of external TaaS cloud 104 by using information associated with components under the control of AV global manager cloud 102, such as, data from on-vehicle services modem 106, on-vehicle services gateway 110, data about connections between on-vehicle services modem 106 and on-vehicle services gateway 110, or data about links from AV global manager cloud 102 to on-vehicle autonomous vehicle system 112. In addition, AV global manager cloud 102 can also determine data about messages sent to the modem from external TaaS cloud 104.

As previously described, the input to external TaaS cloud 104, which resides in the cloud black box, can be defined and input by AV global manager cloud 102, and a portion of this message may be defined by AV global manager cloud 102 as confirmation data, which is carried through to the on-vehicle TaaS components and also used as validation information by autonomous vehicle system 112.

AV global manager cloud 102 with on-vehicle autonomous vehicle system 112 sends confirmation via a communication link in environment 100. In some examples, a message for communicating to external TaaS cloud 104 provides information about how the TaaS message may go through the partner cloud and the result recorded at autonomous vehicle system 112 (e.g., the result). Accordingly, once the result is recorded, information about autonomous vehicle system 112 may be used to provide confidence (e.g., a confidence threshold, etc.) that the on-vehicle modem and gateway infrastructure are working properly and can rule out potential noise in integration efforts.

In some non-limiting embodiments or aspects, testing may also debug and eliminate potential problems that have been confirmed or obviated. In such an example, by eliminating a potential problem, the AV global manager cloud 102 can use this information to infer where an actual problem does exist (e.g., by eliminating enough problems, AV global manager cloud 102 can more easily infer a problem, etc.). For example, AV global manager cloud 102 may validate an assumption of a problem (e.g., signal interference, modem configuration issues, environmental concerns, etc.) with on-vehicle services modem 106, or alternatively, on-vehicle services gateway 110 during TaaS testing, by monitoring the communication links between AV global manager cloud 102 and on-vehicle autonomous vehicle system 112. Alternatively, AV global manager cloud 102 may eliminate the existence of a problem with on-vehicle services modem 106 or on-vehicle services gateway 110 during TaaS testing by monitoring the links between AV global manager cloud 102 and on-vehicle autonomous vehicle system 112.

In some non-limiting embodiments or aspects, validations can be based on signals (e.g., messages, requests, information, etc.) made by checking or monitoring one or more communication links between the on-vehicle vehicle compute (e.g., one or more processors, modules, or components of on-vehicle autonomous vehicle system 112) and the off board cloud infrastructure (AV global manager cloud 102). For example, signals sent over the communication link may be received, obtained, read, or monitored by on-vehicle services modem 106, or alternatively, on-vehicle services gateway 110, and such signals may be used during TaaS testing to validate inputs from autonomous vehicle system 112 to on-vehicle services gateway 110 in the on-vehicle black box (e.g., where messages may not be accessible or readable externally, such as autonomous vehicle system 112, on-vehicle services modem 106, or on-vehicle services gateway 110).

In this way, environment 100 can validate inputs from AV global manager cloud 102 to external TaaS cloud 104, output from external TaaS cloud 104 communicated to on-vehicle external TaaS components 108 (e.g., inputs to on-vehicle external TaaS components 108 and received first in on-vehicle services modem 106), on-vehicle compute inputs to the on-vehicle black box (e.g., on-vehicle external TaaS components 108), and vehicle health information (e.g., modem health, gateway health, communication link signals, etc.). Such information can be used to efficiently and accurately determine information that can be used to debug and diagnose problems in an AV or external to an AV that may be affecting a problem in the on-vehicle systems, including those in environment 100.

The above actions and constraints are provided for example purposes and other possible information, inferences, and/or validations are within the scope of this disclosure.

Figure 2:
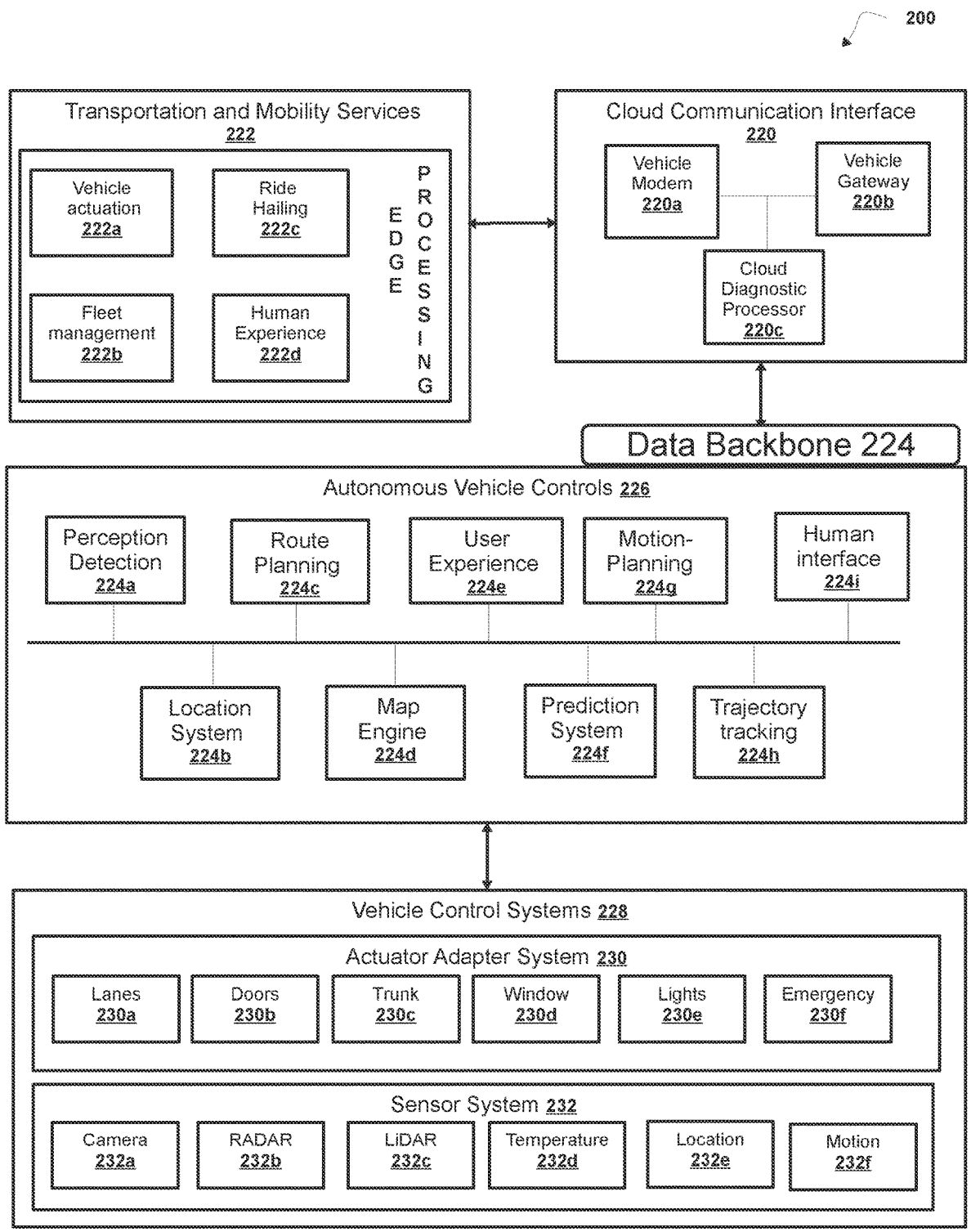
FIG. 2 is a diagram of non-limiting embodiments or aspects of an autonomous vehicle in which testing of cloud systems and autonomous vehicle systems, as described herein, may be implemented.

Referring now to FIG. 2, FIG. 2 is a diagram of an example vehicle computing system 200 in which devices, systems, and/or methods, described herein, may be implemented. Vehicle computing system 200 may be the same as or different than on-vehicle autonomous vehicle system 112. As shown in FIG. 2, vehicle computing system 200 includes cloud communication interface 220, transportation and mobility service(s) 222, data backbone 224, autonomous vehicle controls 226, vehicle control systems 228, actuator adapter system 230, and sensor system 232.

Vehicle computing system 200 may interconnect (e.g., establish a connection to communicate and/or the like) via cloud communication interface 220 to remote cloud systems, offering cloud services, remote data, and processing systems (e.g., mobility and autonomy services and sources, computing devices, external computing systems, etc.), for example, vehicle modem 220a of vehicle computing system 200 may utilize wired connections and/or wireless connections to provide an input or output exchange with AV global manager cloud 102 (e.g., one or more systems of, etc.) and external TaaS cloud 104 (e.g., one or more remote external clouds 104). Additionally, vehicle modem 220a may utilize wired connections and/or wireless connections to provide an input or output exchange with local vehicle systems (e.g., one or more systems of an autonomous vehicle, etc.). Vehicle modem 220a connects to and transmits and receives data from vehicle gateway 220b. Cloud diagnostic processor 220c provides diagnostic algorithms to process cloud service messages received by cloud communication interface 220, for example, providing one or more systems for monitoring and processing data received from a remote cloud service and for processing data to be transmitted and received edge processing of transportation and mobility services 222.

Cloud communication interface 220 may comprise any type of network, such as, a local area network (LAN), a wide area network (WAN) (such as, a fleet management system utilizing a secure network, or a secure connection via the Internet, a cellular network, a satellite network, or a combination thereof, and may be wired or wireless).

With continued reference to FIG. 2, vehicle computing system 200 includes transportation and mobility services 222 that utilize edge processing and connect to cloud communication interface 220 for accessibility to cloud service communications and data backbone 224. Transportation and mobility services 222 includes on-vehicle TaaS service components for processing specified cloud services on board an autonomous vehicle, such as, vehicle actuation 222a, fleet management 222b, ride hailing 222c, and human experience 222d.

In some non-limiting embodiments or aspects, vehicle computing system 200 includes components for autonomous operation of the autonomous vehicle to store or retrieve (e.g., request, receive, etc.) vehicle information from data backbone 224 (e.g., one or more data stores and/or one or more central servers via cloud communication interface 220). For example, vehicle computing system 200 may synchronize (e.g., update, change, etc.) a subset of data residing in a data store(s) of data backbone 224 with user experience 224e, with map data (e.g., a portion or sub-map of map data in a specified geographic location) in map engine 224d, or vehicle control data in one or more vehicle control components of vehicle control systems 228 as the autonomous vehicle is traversing a roadway. Multiple autonomous vehicles may be coupled to each other and/or coupled from a remote location to data backbone 224 via cloud communication interface 220. Data backbone(s) 224 may include more than one data store(s), such as, without limitation, map data store(s), traffic information data store(s), user experience data store(s), point of interest data store(s), trajectory data store(s), and/or the like. Data backbone 224 may comprise a data array or cluster of data servers, may replicate with one or more remote data store(s) via cloud communication interface 220, or may comprise web applications, web application servers, remote connected backend servers, or a combination thereof.

With continued reference to FIG. 2, autonomous vehicle control 226 may receive data collected by data backbone 224, one or more actuators of actuator adapter system 230 or, one or more sensors of sensor system 232, analyze, and provide one or more vehicle control instructions to perception detection 224a, location system 224b, route planning 224c, map engine 224d, user experience 224e, prediction system 224f, motion planning 224g, trajectory tracking 224h, and human interface 224i.

Location system 224b may include and/or may retrieve map data (e.g., map information, etc.) from map engine 224d which provides detailed information about a surrounding environment of the autonomous vehicle. In some non-limiting embodiments or aspects, location system 224b may include and/or may retrieve map data (e.g., map information, etc.) that provides detailed information about the surrounding environment of the autonomous vehicle. The map data can provide information regarding: the identity or location of different roadways, road segments, buildings, or other objects; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data (as described above) that provides information and assists autonomous vehicle control 226 in analyzing a surrounding environment of the autonomous vehicle. In some non-limiting embodiments or aspects, map data may also include reference path information corresponding to common patterns of vehicle travel along one or more lanes such that a motion of an object is constrained to the reference path (e.g., locations within traffic lanes on which an object commonly travels). Such reference paths may be pre-defined, such as, the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 224b may also include and/or may receive information relating to a trip or route of a user, real-time traffic information on the route, and/or the like.

Location system 224b may also comprise and/or may communicate with route planning 224c which generates a navigation route from a start position to a destination position for AV global manager cloud 102. Route planning 224c may access map engine 224d (e.g., a central map data store stored in data pipeline) to identify possible routes and road segments where a vehicle may travel, to travel from a start position to a destination position. Route planning 224c may score the possible routes and identify a preferred route to reach the destination. For example, route planning 224c may generate a navigation route that minimizes a distance traveled or other cost function while traversing the route and may further access the traffic information and/or estimates that can affect an amount of time it will take to travel on a particular route. Depending on implementation, route planning 224c may generate one or more routes using various routing methods, such as, Dijkstra's algorithm, Bellman-Ford's algorithm, and/or the like. Route planning 224c may also use the traffic information to generate a navigation route which reflects an expected experience or condition of the route (e.g., current day of the week or current time of day, etc.), such that a route generated for travel during rush-hour may differ from a route generated for travel late at night. Route planning 224c may also generate more than one navigation route to a destination and send more than one of these navigation routes to user experience 224e (e.g., a tablet, a mobile device, etc.) for selection by a user from among various possible routes.

Perception detection 224a may detect perception information of the surrounding environment of autonomous vehicle during travel from the start position to the destination along the preferred route, perception detection 224a may detect objects or other roadway characteristics based on sensor data provided by sensor system 232 and information obtained by location system 224b. The perception information represents what an ordinary driver perceives in the surrounding environment of a vehicle. The perception data may include information relating to one or more objects in the environment of the autonomous vehicle. For example, prediction system 224f may process sensor data (e.g., from LiDAR 232c, RADAR 232b, camera 232a images, etc.) in order to identify objects and/or features in the geospatial area of the autonomous vehicle. Detected objects may include traffic signals, roadway boundaries, vehicles, pedestrians, and/or obstacles in the roadway, and/or the like. Perception detection 224a may use known object recognition and detection algorithms, video tracking algorithms, and computer vision algorithms (e.g., track objects frame-to-frame iteratively over a number of time periods) to determine the perception.

In some non-limiting embodiments or aspects, perception detection 224a may also determine, for one or more identified objects in the environment, a current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 224f may predict the future locations, trajectories, and/or actions of the objects based at least in part on perception information (e.g., the state data for each object) received from perception detection 224a, the location information received from location system 224b, the sensor data, and/or any other data describing a past and/or current state of the objects, autonomous vehicle, the surrounding environment, and/or their relationship(s). For example, if an object is a vehicle and the current driving environment includes an intersection, prediction system 224f may predict whether the object will likely move straight forward or make a turn. If the perception data indicates that the intersection has no traffic light, prediction system 224f may also predict whether the vehicle may fully stop prior to entering the intersection. Such predictions may be made for a given time horizon (e.g., 5 seconds in the future). In certain embodiments, prediction system 224f may provide the predicted trajectory or trajectories for each object to motion planning 224g.

Motion planning 224g may determine a motion plan for the autonomous vehicle based on the perception data and/or the prediction data. Specifically, given predictions about the future locations of proximate objects and other perception data, motion planning system 224g can determine a motion plan for autonomously navigating a route relative to one or more objects at their future locations.

In some non-limiting embodiments or aspects, motion planning 224g may receive one or more predictions from prediction system 224f and make a decision regarding how to handle objects in the environment of the autonomous vehicle. For a particular object (e.g., a vehicle with a given speed, direction, turning angle, etc.), motion planning 224g determines whether to overtake, yield, stop, and/or pass based on, for example, traffic conditions, map data, state of the autonomous vehicle, and/or the like. In some non-limiting embodiments or aspects, for a given object, motion planning 224g may decide a course to handle the object and may determine one or more safe actions for responding to the presence of the object. For example, for a given object, motion planning 224g may decide to pass the object and then may determine whether to pass on the left side or right side of the object (including motion parameters, such as, speed and lane change decisions). Motion planning 224g in connection with trajectory tracking 224h may also assess a risk of a collision between a detected object and autonomous vehicle. If the risk exceeds an acceptable threshold, it may determine whether a collision can be avoided if the autonomous vehicle follows a defined vehicle trajectory and/or implements one or more dynamically generated emergency maneuvers performed in a pre-defined time period (e.g., N milliseconds). If the collision can be avoided, then autonomous vehicle control 226 may transmit appropriate control instructions to vehicle control system 228 for execution to perform a cautious maneuver (e.g., mildly slow down, accelerate, change lane, or swerve). In contrast, if the collision cannot be avoided, then autonomous vehicle controls 226 may transmit appropriate control instructions to vehicle control system 228 for execution of an emergency maneuver (e.g., brake and/or change direction of travel).

Trajectory tracking 224h also plans a trajectory ("trajectory generation") for an autonomous vehicle to traverse on a pre-defined route (e.g., a nominal route generated by route planning 224c). The trajectory specifies a path for the autonomous vehicle, as well as, a velocity profile. The autonomous vehicle control 226 converts the trajectory into control instructions for vehicle control system 228, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of motion planning 224g is to generate a trajectory for motion of the vehicle from a start position to a destination on the nominal route, taking into account the perception and prediction data.

Motion planning 224g may generate a trajectory by performing topological planning using the topological planning techniques described herein to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects, such as, traffic cones and bollards, or other road users, such as, pedestrians, cyclists, and cars (e.g., moving cars, parked cars, double parked cars, etc.). Restricted map areas may include, for example, crosswalks and intersections. Discrete actions may include, for example, to stop before or proceed through, to track ahead or behind, or to pass on the left or right of an object (e.g., obstacle, constraint, etc.).

Motion planning 224g may use the preferred route information provided by route planning 224c in combination with perception data, prediction data to select the optimal trajectory, as discussed below.

As discussed above, motion planning 224g determines or generates planning and control data regarding the movement of the autonomous vehicle that is transmitted to vehicle control system 228 for execution. Vehicle control system 228 may, for example, control braking via a brake controller; direction via a steering controller; speed and acceleration via a throttle controller (in a gas-powered vehicle); or a motor speed controller (such as, a current level controller in an electric vehicle); a differential gear controller (in vehicles with transmissions); and/or other controls.

Actuator adapter system 230 may include one or more actuators that are coupled to vehicle control system 228 and/or otherwise connected or included within the autonomous vehicle. Examples of such actuators may include, without limitation, lanes 230a that recognizes the markings on a road so that if a vehicle or other object crosses these markings, lanes 230a acts on the steering, by correcting its position. At the same time, the system may detect when the driver removes her hands from the wheel for a period of time (e.g., a few seconds), the system can may be configured to play a sound and visual warning will activate so that the driver takes the car's controls once again.

Door 230b actuator modules manage all actuators in the driver or passenger door and may be directly connected to vehicle control system 228. Central locking for doors and trunks 230c (e.g., tailgate, etc.), window 230d actuators, as well as, mirror adjustment are controlled by an engine control unit (e.g., ECU) under control of vehicle control system 228. Light management is also part of the functionality, including illumination of the switch panel lock and mirror heating status and entrance light for user experience. Lights 230e may increase the high beams, or control other lighting, and an actuator for emergency 230f control is capable of fully stopping the vehicle in case a driver moves her hands away from the steering for a programmed period of time, to understand that the driver has suffered some form of loss of consciousness.

Sensor system 232 may include one or more sensors that are coupled to vehicle control system 228 and/or otherwise connected or included within the autonomous vehicle. Examples of such sensors include, without limitation, LiDAR 232c, RADAR 232b, one or more cameras 232a (e.g., visible spectrum cameras, infrared cameras, etc.), temperature 232d, position sensors, location 232e (e.g., global positioning system (GPS), etc.), fuel sensors, speed sensors, odometer sensors, motion 232f (e.g., inertial measurement units (IMU), accelerometer, gyroscope, etc.), object detection sensors, such as, one or more camera humidity sensors, environmental sensors (e.g., a precipitation sensor and/or ambient temperature sensor), occupancy sensors, or the like. The sensor data can include information that describes the location of objects within the surrounding environment of the autonomous vehicle, information about the environment itself, information about the motion of the autonomous vehicle, information about a route of the autonomous vehicle, or the like.

The autonomous vehicle may further include certain components (not shown here) included in vehicles, such as, an engine, wheels, steering wheel, transmission, etc., which may be controlled by data backbone 224 or, alternatively, autonomous vehicle controls 226, using a variety of communication signals and/or commands, such as, for example, acceleration signals or commands, deceleration signals or commands, steering signals or commands, braking signals or commands, etc.

In the various embodiments discussed in this document, the description may state that the vehicle or a controller included in the vehicle (e.g., in an on-vehicle computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-vehicle controller and/or vehicle control system, such as, cloud service providers. Examples of such other computing devices include an electronic device (such as, a smartphone) associated with a person who is riding in the vehicle, as well as, a remote cloud server that is in electronic communication with the vehicle via a wireless network. The processor of any such device may perform the operations that will be discussed below.

With further reference to FIG. 2, sensor system 232 may be configured to allow communication between AV global manager cloud 102 and external systems, such as, for example, external devices, sensors, other vehicles, servers, data stores, databases etc. Cloud communication interface 220 may utilize any now or hereafter known protocols, protection schemes, encodings, formats, packaging, etc., such as, without limitation, Wi-Fi, an infrared link, Bluetooth®, etc. driver interface system (e.g., user experience 224e and/or human interface 224i) may be part of peripheral devices implemented within an autonomous vehicle including, for example, a keypad, a touch screen display device (such as, a graphical user interface GUI), a microphone, and a speaker, etc. For example, an autonomous vehicle may include a GUI on which is displayed a testing and debugging information of the autonomous vehicle, such as, by indicating or displaying data or information for validating one or more cloud services. The testing and debugging information displayed on a GUI may be one that is determined through the cloud service process in connection with autonomous vehicle controls 226, as described herein.

Figure 3:
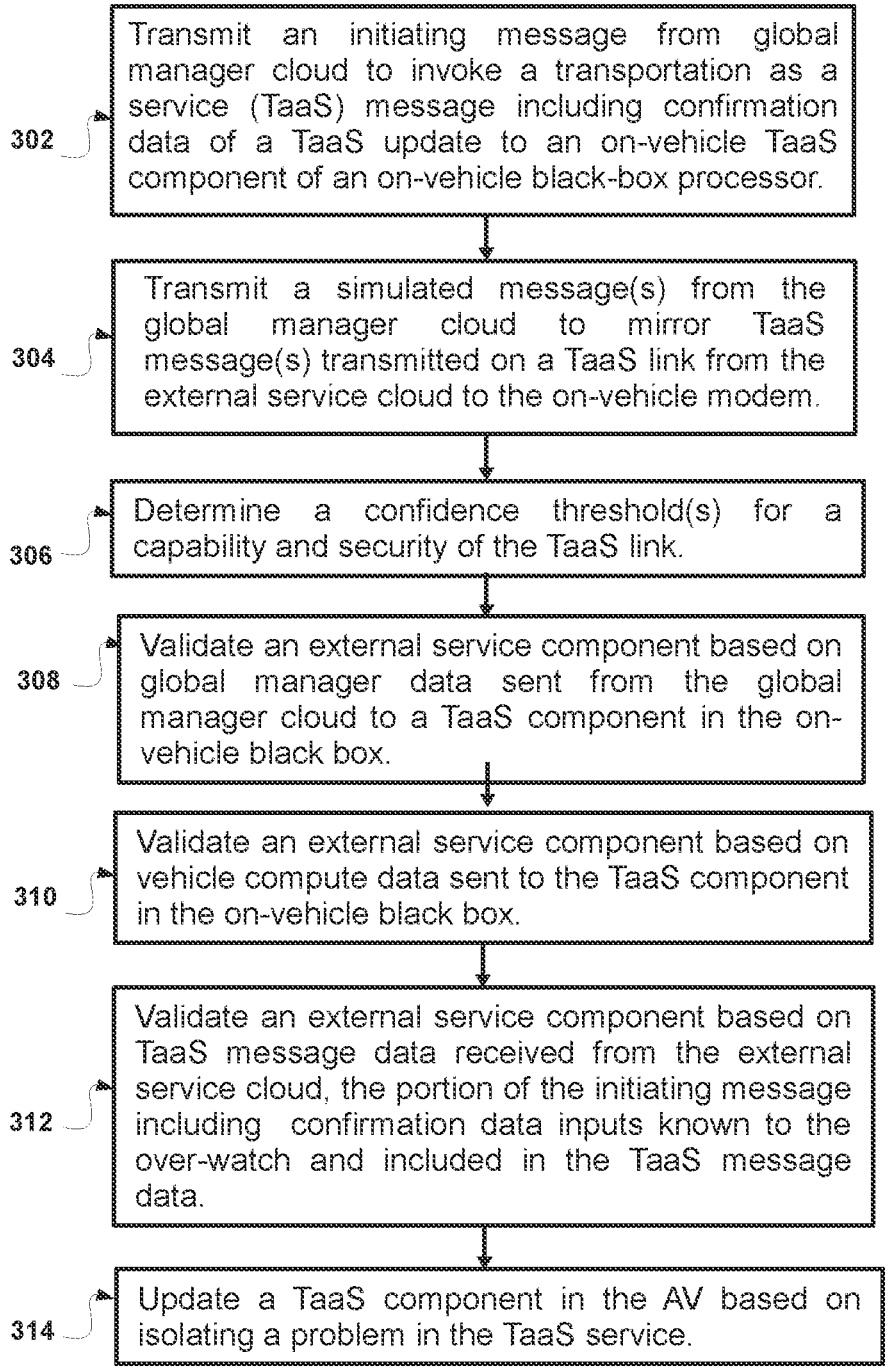
FIG. 3 is a flowchart illustrating a non-limiting embodiment or aspect of a method for testing of cloud systems and autonomous vehicle systems according to the principles of the present disclosure.

Referring now to FIG. 3, FIG. 3 is a flowchart of a non-limiting embodiment or aspect of process 300 for testing of cloud and autonomous vehicle systems. In some non-limiting embodiments or aspects, one or more of the steps of process 300 for testing of cloud and autonomous vehicle systems may be performed (e.g., completely, partially, and/or the like) by AV global manager cloud 102 (e.g., one or more devices of AV global manager cloud 102). In some non-limiting embodiments or aspects, one or more of the steps of process 300 may be performed (e.g., completely, partially, and/or the like) by on-vehicle services modem 106 (e.g., one or more devices of on-vehicle services modem 106), by on-vehicle services gateway 110 (e.g., one or more devices of on-vehicle services gateway 110), by on-vehicle autonomous vehicle system 112 (e.g., one or more devices of on-vehicle autonomous vehicle system 112).

As shown in FIG. 3, at step 302, process 300 may include transmitting an initiating message from a global manager cloud to invoke a transportation as a service (TaaS) message including confirmation data of a TaaS update to an on-vehicle TaaS component of an on-vehicle black-box processor. For example, AV global manager cloud 102 transmits an initiating message from a global manager cloud to invoke a transportation as a service (TaaS) message including confirmation data of a TaaS update to an on-vehicle TaaS component of an on-vehicle black-box processor. In some non-limiting embodiments or aspects, on-vehicle services modem 106 receives, from one or more external clouds via an on-vehicle modem (e.g., on-vehicle services modem 106), one or more transportation services, wherein a transportation as a service (TaaS) is provided by an external cloud by sending a plurality of TaaS messages over a TaaS link to the on-vehicle modem in response to an initiating message from a global manager cloud, the TaaS messages programmed to update an on-vehicle TaaS component.

In some non-limiting embodiments or aspects, the simulated message generated by AV global manager cloud 102 is sent to the AV via external TaaS cloud 104 comprising data associated with defining the TaaS message, and data that is previously known and defined by AV global manager cloud 102. In some examples, the simulated message includes information based on the data that is known by the global manager cloud, such as, information that can be displayed in a device of the AV, or alternatively, data associated with information known to be logged, or trigger a device of the autonomous vehicle system 112 or AV global manager cloud 102 to process, log, or store such data or information.

Figure 4:
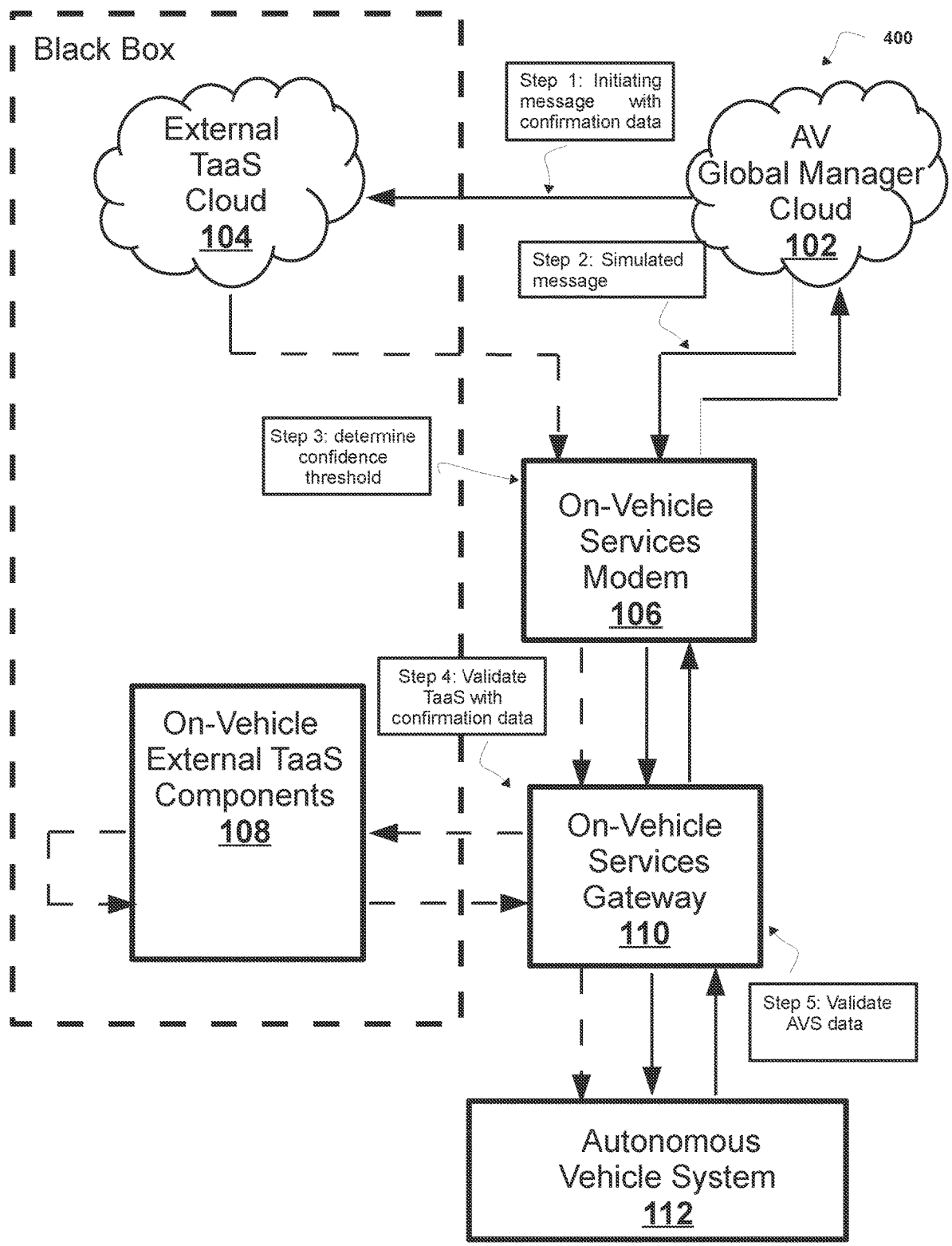
FIG. 4 is a step diagram of non-limiting embodiments or aspects of a service cloud environment in which systems, apparatuses, and/or methods, as described herein, may be implemented.

With reference to FIG. 4, step 1, AV global manager cloud 102 is shown initiating a message with confirmation data to external TaaS cloud 104, a portion of which is then included in a TaaS message from external TaaS cloud 104 to on-vehicle services modem 106.

Returning to FIG. 3, according to some non-limiting embodiments or aspects, the on-vehicle modem (e.g., on-vehicle services modem 106, etc.) comprises a TaaS gateway (e.g., on-vehicle services gateway 110, etc.) for routing and receiving TaaS messages. In some examples, the on-vehicle services gateway 110 may comprise a software extension, software injection, or otherwise customized library, that includes instructions executable in the TaaS gateway and programmed for matching with an indication of an incoming TaaS message, the instructions when executed performing an action, or triggering activity, such as, to send a message or signal to another part of autonomous vehicle system 112 or a cloud service component. In another example, on-vehicle services gateway 110 or on-vehicle services modem 106 may be configured or programmed to perform a pre-defined command, or remote command (e.g., remotely activated by global manager cloud 102, etc.) that sends a TaaS message (e.g., request, response, status, confirmation, etc.) to a service cloud or global manager cloud. In such an example, the TaaS gateway (e.g., on-vehicle services gateway 110, etc.) automatically executes instructions and transfers testing or diagnostic information for a received TaaS message including vehicle metrics, communication metrics, sensor metrics, or travel information back to AV global manager cloud 102.

As shown in FIG. 3, at step 304, process 300 may include transmitting a simulated message from the global manager cloud to mirror a TaaS message transmitted on a TaaS link from the external service cloud to the on-vehicle modem. For example, AV global manager cloud 102 transmits a simulated message from the global manager cloud to mirror the TaaS message that has been previously, or alternatively, simultaneously transmitted on a TaaS link from the external service cloud to the on-vehicle modem. On-vehicle services modem 106 receives the simulated message via the link to/from the global manager. In an example, the simulated message generated and configured to mirror the TaaS message transmitted on the link between the external service cloud (e.g., external TaaS cloud 104) and the on-vehicle modem (on-vehicle services modem 106) to generate information associated with the TaaS link and the TaaS message. For example, a simulated message is configured to follow a same or substantially similar path to autonomous vehicle system 112. In addition, the simulated message may pass to the on-vehicle services gateway 110 and on-vehicle services modem 106. In some examples, an on-vehicle services gateway 110 includes an on-vehicle services modem 106, and performs one or more steps of on-vehicle services modem 106.

In some non-limiting embodiments or aspects, AV global manager cloud 102 generates a simulated message to provide information about the TaaS message or external TaaS cloud 104, by mirroring at least a portion of a TaaS infrastructure or path. In addition, AV global manager cloud 102 generates a portion of a simulated message that includes types of service data that can be included to be used as identifying information for diagnosing a communication link of the message. In some non-limiting embodiments or aspects, on-vehicle services modem 106 may determine a confidence threshold from the simulated message by eliminating one or more health condition associated with a TaaS communication link based on a traversal by the simulated message (e.g., between the global manager and the on-vehicle services modem 106), or based on the contents of the simulated message.

With reference to FIG. 4, step 2 shows on-vehicle services gateway 110 generating and transmitting a simulated message that can be used to determine a diagnoses, bug, or other health condition associated with a traversal of the communication link and monitoring the simulated message over the communication link that is the same, or shares the same characteristics, as the communication link formed between external TaaS cloud 104 and on-vehicle services modem 106.

Returning to FIG. 3, in some non-limiting embodiments or aspects, the black box processor of FIG. 3 can comprise an on-vehicle service cloud using an ECU or some other secure processor, such as, a secure crypto-processor and/or the like, that is a dedicated computer-on-a-chip or microprocessor, embedded in a packaging with multiple physical security measures, to obtain a degree of tamper resistance. In some examples, the external cloud information is hidden or secret while transmitting between the external cloud and the black-box processor.

As shown in FIG. 3, at step 306, process 300 may include determining a confidence threshold for a capability and security of the TaaS link. According to some non-limiting embodiments or aspects, on-vehicle services modem 106, on-vehicle services gateway 110, or a combination, determines a confidence threshold for a capability or security of the TaaS link. On-vehicle services modem 106 may perform one or more steps using data (e.g., parameters, inputs, etc.) to determine a confidence threshold within a range (e.g., a metric, etc.) after the simulated message is received in the autonomous vehicle system 112. For example, at threshold level A, confidence may be a maximum, while at level F, confidence is lowest, indicating no confidence in transmissions over the TaaS link. In some examples, intermittent and or other severity levels can be divided within a range or an identification system.

In some non-limiting embodiments or aspects, on-vehicle services modem 106 determines a confidence threshold by eliminating one or more health conditions associated with a TaaS communication link based on a traversal by the simulated message. In some cases, a simulated message provides confidence information about the TaaS message by traversing a communication link mirroring (or using), or at least a significant portion of the link and/or the TaaS infrastructure comprising the infrastructure of the link (e.g., a communication device, a communication medium, etc.). A simulated message may provide information for identifying a TaaS message, external TaaS cloud 104 (e.g., one or more computing devices, etc.), or on-vehicle external TaaS component 108. In this way, a simulated message can be used to gather information while traversing a path, while the information for identifying can be used to store the information in association with an identified message (e.g., or group of messages, type of messages, recipient, or sender, etc.).

In some non-limiting embodiments or aspects, on-vehicle services modem 106 (e.g., the on-vehicle modem, etc.) receives a TaaS message for processing and routing in a TaaS gateway to handle a TaaS message. In such an example, on-vehicle services modem 106 may generate or transmit a message to AV global manager cloud 102 indicating that AV global manager cloud 102 should perform testing or diagnostics processing on one or more TaaS messages sent to a vehicle fleet or other AV. For example, a simulated message may be programmed or configured to traverse a communication link to the autonomous vehicle system 112, while a TaaS message is traversing such a link (e.g., using a timed switch, a programmed switch, a debug routine, etc.).

In some non-limiting embodiments or aspects, determining a confidence threshold for a capability and security of the TaaS link, may comprise validating data, parameters, or input of the TaaS service. In one example, a TaaS service may validate inputs via an on-vehicle service that involves output display, such as an adaptive driver assistance to deliver on closed, private roads, and in dedicated, fenced off lanes, or active roadway navigation. In some examples, such a system may provide multiple inputs, receiving input from multiple systems, and may include multiple discrete outputs, and/or multiple adaptable outputs for validating different input sources. In some cases, validating a simulation service includes services for providing environment models, traffic models, vehicle models, sensor models, or scenario models. In some non-limiting embodiments or aspects, determining a confidence threshold for a capability and security of the TaaS link may comprise validating a localization service, for example, validating a service using high density maps that rely on maps that may use external GPS, or other like data to localize a vehicle or geospatial area within a range. TaaS service may be updated for determining and testing a service providing a mission from point A to B.

Still further, determining a confidence threshold for a capability and security of the TaaS link includes validating an integrated vehicle services, such as, the following: user enrollment, including account registration, billing, and account preferences, and/or the like; setting preferences, including subscription services for navigation, weather, traffic, insurance purchase, feature purchase, vehicle preferences and settings, and/or the like; finding a car, locate nearby car, select car types and preferences, car health status, directions to car, metering data, and/or the like; accessing a car, including, user authorization and validation, lock/unlock doors, validate vehicle health, billing initialization, and/or the like; downloading preferences and settings, including subscription download, vehicle settings download, purchased feature download, and/or the like; vehicle services, including starting a car, insurance activation, driver behavioral data upload, GPS and metering data upload, vehicle diagnostic data upload, notifications and alerts, and/or the like; purchase services, including parking finder, road side assistance, real-time services for fuel prices, traffic weather, pay-per-use services for highway and bridge tolls, parking, speeding tickets, car return, nearby fuel services, prices and ordering, check-in, and/or the like; billing services, including vehicle usage billing, one time services, vehicle health, and/or the like; and fleet monitoring and predictive maintenance platform, including fleet management to monitor fleet vehicles, performance and location, and predict individual vehicle maintenance needs.

In some non-limiting embodiments or aspects, after aggregating TaaS messages, such as, one or more messages sent from vehicles across a fleet in on-vehicle services modem 106 or on-vehicle services gateway 110, associated with a specific software bug and/or known issue, vehicle services modem 106 receives a further response. In addition, on-vehicle services modem 106 may log confidence information or data for forming a confidence as simulated messages are received. The response may be a testing message including instructions created by AV global manager cloud 102 or external TaaS cloud 104 and may trigger one or more processors of a TaaS gateway to create or execute a specific injection rule associated with the TaaS message. The injection rule may consist of a series of data (e.g., parameters, etc.) that apply to content in a TaaS message in order to respond to a situation based on receiving specific information.

As shown in FIG. 3, at step 308, process 300 may include validating AV service data sent from the global manager cloud to a TaaS component in an on-vehicle black box of the autonomous vehicle system. For example, on-vehicle services modem 106 validates an external service component based on AV service data sent from the global manager cloud to a TaaS component in the on-vehicle black box. For example, on-vehicle services gateway 110 receives AV service data sent from the global manager cloud, by passing it through the TaaS component in the on-vehicle black box. On-vehicle services modem 106 confirms from data received, stored, and monitored to determine, a capability or security of on-vehicle external TaaS component 108 (e.g., a confidence level, etc.). The confirmation data can be made to display in on-vehicle external TaaS component 108 or a device under the control of on-vehicle external TaaS component 108. The information to display may be used to make a determination about on-vehicle external TaaS component 108. For example, a message may target a specific device with capability to display validation choices or options for validating a message.

With reference to FIG. 4, Step 3 shows AV global manager cloud 102, or alternatively, on-vehicle services gateway 110, or an on-vehicle testing module, such as, a testing module of on-vehicle services gateway 110, on-vehicle services modem 106, autonomous vehicle system 112, or AV global manager cloud 102, in any combination, or alone, receiving input from on-vehicle services and determining a confidence threshold.

In some non-limiting embodiments or aspects, on-vehicle services modem 106 receives information from a service cloud, AV global manager cloud 102, autonomous vehicle control system 112, a processor of a gateway processor, or alternatively, an edge processor that may be activated by the information to process the received information, generate a message or command based on the contents, and transmit the message or command to a global manager cloud configured to act on the message, or alternatively, to send a message directly to the AV, an edge processor for diagnosing a TaaS component, or an external service cloud. Testing and debug information may comprise at least one of diagnostic information, location information, fleet information, routing information, or vehicle information.

As shown in FIG. 3, at step 310, process 300 includes validating AV compute data sent from the autonomous vehicle system to the TaaS component in the on-vehicle black box. For example, on-vehicle services gateway 110 validates AV compute data sent from the autonomous vehicle system to the TaaS component in the on-vehicle black box.

For example, with reference to FIG. 4, Step 5, shows AV global manager cloud 102, or alternatively, on-vehicle services gateway 110, an on-vehicle testing module, such as, a testing module of on-vehicle services gateway 110, on-vehicle services modem 106, autonomous vehicle system 112, or AV global manager cloud 102, alone or in any combination, validating AVS data sent via a message or response on-vehicle external TaaS component 108 (e.g., one or more components of on-vehicle external TaaS component 108, etc.).

In some non-limiting embodiments or aspects, testing and debug information may comprise at least one of diagnostic information, location information, fleet information, routing information, or vehicle information. In some examples, in response to determining a problem associated with the TaaS link, AV global manager cloud 102 validates one or more cloud inputs before transmitting the TaaS message to the black-box processor, based on the debug information for at least an aspect of the external cloud or the TaaS link to eliminate uncertainty about the cloud inputs for the TaaS component. For example, on-vehicle services gateway 110 validates one or more cloud inputs before transmitting a monitored TaaS message to the black-box processor, based on the debug information for at least an aspect of the external cloud or the TaaS link to eliminate uncertainty about the cloud inputs for the TaaS component.

In some non-limiting embodiments or aspects, validating cloud inputs further comprises determining or identifying a data pipeline integration presenting issues in the TaaS component comprising signal interference, signal jitter, signal timing, message integrity, configuration issues, or environmental concerns. In some examples, after determining the message is invalid, on-vehicle services gateway 110 or on-vehicle autonomous vehicle system 112 controls on-vehicle external TaaS component 108 to send a valid updated message. Alternatively, after determining the message is invalid, AV global manager cloud 102 controls external TaaS cloud 104 to send a valid updated message.

In some non-limiting embodiments or aspects, on-vehicle services gateway 110 validates the TaaS message received from vehicle compute system (e.g., on-vehicleautonomous vehicle system 112) before transmitting the TaaS message to the black-box processor. For example, on-vehicle services gateway 110 validates a response to a TaaS message received from on-vehicle autonomous vehicle system 112. In some examples, on-vehicle services gateway 110 intercepts one or more messages, programming interfaces, or outputs sent from on-vehicle services gateway 110 validates a response to a TaaS message received from on-vehicle autonomous vehicle system 112 from on-vehicle autonomous vehicle system 112, for example, on-vehicle services gateway 110 validates a message based on a response to a TaaS message sent to on-vehicle autonomous vehicle system 112, such as, from on-vehicle autonomous vehicle system 112.

In some non-limiting embodiments or aspects, on-vehicle services gateway 110 transmits directly or indirectly via AV global manager cloud 102, a TaaS outgoing message to other vehicles or a global manager cloud when a potential diagnostic problem for a certain device occurs based on a specified condition, including at least one of a certain geographical location, a specified time, a specified vehicle condition, or a specified network. In such an example, a message may be sent notifying other vehicles that there are potential diagnostic problems for a certain device that occurs at a certain geographical location. The message may be sent when a situation occurs where a diagnostic element reaches a threshold or a combination of vehicle diagnostic elements have specified characteristics.

As shown in FIG. 3, at step 312, process 300 may include validating an external service component based on a TaaS message received from the external service cloud, the portion of the initiating message including confirmation data inputs known to AV global manager cloud 102 and included in the TaaS message data. For example, on-vehicle services modem 106 validates an external service component based on TaaS message data received from the external service cloud, the portion of the initiating message including confirmation data inputs known to AV global manager cloud 102 and included in the TaaS message data.

With reference to FIG. 4, Step 4 shows AV on-vehicle services gateway 110 or alternatively AV global manager cloud 102, an on-vehicle testing module, such as, a testing module of on-vehicle services gateway 110, on-vehicle services modem 106, autonomous vehicle system 112, or AV global manager cloud 102, alone or in any combination, validating TaaS messages from external TaaS cloud 104 with confirmation data.

As shown in FIG. 3, at step 314, process 300 includes updating a TaaS component in the AV based on isolating a problem in the TaaS service. For example, autonomous vehicle system 112 can update a TaaS component in the AV based on isolating a problem in the TaaS service. An external service component is controlled based on vehicle compute data, service data, testing data, TaaS data, and/or the like from external TaaS cloud 104 and sent to the TaaS component of the on-vehicle black box.

In some non-limiting embodiments or aspects, updating a TaaS component in the AV comprises controlling a TaaS component associated with the AV and may be based on information from one or more transportation services. For example, on-vehicle autonomous vehicle system 112 controls a TaaS component associated with the AV based on the information from the one or more transportation services.

In some non-limiting embodiments or aspects, updating a TaaS component comprises, updating one or more of the sensors or actuators on the autonomous vehicle, such as, with multiple LiDAR, camera, and radar sensors configured to essentially detect and perceive, enhance human sight, and situational awareness. Validating may confirm objects that sensors are "perceiving" and for determining the situation evolving outside the car based on messages sent from or to the compute and required by simpler vehicle functions like adaptive cruise control or emergency braking.

In some non-limiting embodiments or aspects, updating a TaaS component in the AV comprises, updating different kinds of information delivered to user experience screens including driver information from autonomous systems, media experiences, driver monitoring systems, sensors facing inside the car, all of which may generate and deliver a personalized in-car experience. In some examples, one or more parameters (e.g., data, information, variables, etc.) are throughput as TaaS services for delivering data to screens and enhanced safety, specifically for critical information, such as, driver warning information.

Although the above systems, methods, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment or example.

What is claimed is:

1. A computer-implemented method of testing a connected TaaS component in an autonomous vehicle system, comprising:

transmitting an initiating message from a global manager cloud to an external service cloud via an on-vehicle modem to invoke a transportation as a service (TaaS) message provided by the external service cloud via a TaaS link to an on-vehicle modem, including confirmation data of the global manager cloud for the TaaS message as a part of a TaaS update to an TaaS component of an on-vehicle black-box processor;

transmitting a simulated message from the global manager cloud, the simulated message programmed to mirror the TaaS message transmitted on the TaaS link from the external service cloud to the on-vehicle modem;

determining, after the simulated message is received in the autonomous vehicle system, a confidence threshold for a capability or security of the TaaS link, comprising:
eliminating one or more health conditions associated with a TaaS communication link based on a traversal of the simulated message;
validating, by the on-vehicle modem, AV service data sent from the global manager cloud to the TaaS component of the on-vehicle black box of the autonomous vehicle system;
validating, by the on-vehicle modem, AV compute data sent from the autonomous vehicle system to the TaaS component of the on-vehicle black box; and
validating, by the autonomous vehicle system, TaaS message data received from the external service cloud, wherein validating is based on the confirmation data included in the TaaS message data from the initiating message; and updating the TaaS component in the autonomous vehicle system based on a problem in the TaaS component of the on-vehicle black box.

2. The computer-implemented method of claim 1, wherein determining the confidence threshold, further comprises:
determining that a communication interface is causing issues in the TaaS component comprising signal interference, signal jitter, signal timing, message integrity, configuration issues, or environmental concerns; and
controlling the on-vehicle black box to send a valid updated message.

3. The computer-implemented method of claim 1, wherein the TaaS component comprises at least one of a diagnostic service, location service, fleet service, routing service, device service, user experience service, or telematics service.

4. The computer-implemented method of claim 1, wherein the external service cloud information is hidden or secret while transmitting between the external service cloud and the on-vehicle black box, and wherein validating TaaS message data comprises at least one of: comparing confirmation data to confirmation data sent to the external service cloud in the initiating message, displaying the confirmation data to a diagnostic display device, displaying the confirmation data in a device of the autonomous vehicle system during a testing procedure, automatically logging non-conforming confirmation data, or automatically comparing confirmation data to the initiating message and transmitting a signal when the confirmation data does not conform.

5. The computer-implemented method of claim 1, wherein updating the TaaS component further comprises debugging one or more software bugs, one or more hardware malfunctions, or one or more networking issues inside of one or more external service clouds or one or more on-vehicle cloud systems.

6. The computer-implemented method of claim 5, wherein validating the on-vehicle TaaS component comprises:
displaying test data on an external situational awareness module, including route information provided by the global manager cloud, passenger fare information from the external service cloud, and real-time sensor information from the autonomous vehicle system, wherein the test data provides confirmation of message content from the global manager cloud, the external service cloud, and the autonomous vehicle system.

7. The computer-implemented method of claim 1, wherein the on-vehicle modem comprises a TaaS gateway for receiving, routing, and testing TaaS messages, the TaaS gateway comprising a software extension, software injection, or customized software library, including instructions executable in the TaaS gateway when matching with an indication of an incoming TaaS message, instructions programmed to perform an action, to send a message, or perform a remote command back to the external service cloud or global manager cloud, wherein the TaaS gateway automatically executes instructions and transfers diagnostic information for a received TaaS message including vehicle metrics, communication metrics, sensor metrics, or travel information.

8. The computer-implemented method of claim 7, wherein the on-vehicle modem receives a TaaS message to control the TaaS gateway to handle the TaaS message, wherein the on-vehicle modem may generate or transmit a message to the global manager cloud indicating to perform predictive diagnostics processing on one or more messages sent to a vehicle fleet after aggregating messages across a fleet associated with a specific software bug and/or known issue, and further wherein, in response, the on-vehicle modem receives a diagnostic message including instructions created by the global manager cloud or external service cloud to trigger one or more processors of the TaaS gateway for creation or execution of a specific injection rule associated with the TaaS message.

9. The computer-implemented method of claim 7, wherein the TaaS gateway transmits a TaaS outgoing message to other vehicles or global manager cloud when a potential diagnostic problem for a certain device occurs based on a specified condition, including at least one of a certain geographical location, a specified time, a specified vehicle condition, a specified network, wherein transmitting the TaaS outgoing message comprises:
notifying other vehicles that there are potential diagnostic problem for the certain device that occurs at the certain geographical location, or when the confidence threshold reaches a predetermined level;
generating a message or command based on received information; and
transmitting the message or command to the global manager cloud that is configured to act on the message, or alternatively, to transmit the message directly to the autonomous vehicle system, the edge processor for diagnosing the TaaS component, or the external service cloud.

10. The computer-implemented method of claim 1, wherein the on-vehicle modem receives information from the external service cloud, the global manager cloud, a vehicle control system, a processor of a TaaS gateway, or alternatively, an edge processor that may be activated by the global manager cloud to process TaaS messages, global manager messages, or autonomous vehicle system messages.

11. A cloud and autonomous vehicle compute testing system, comprising:
one or more processors programmed and/or configured to:
transmit an initiating message from a global manager cloud to an external service cloud via an on-vehicle modem, the initiating message configured to invoke a transportation as a service (TaaS) message provided by the external service cloud via a TaaS link to the on-vehicle modem, including confirmation data of the global manager cloud for a TaaS message as a part of a TaaS update to a TaaS component of an on-vehicle black-box processor;

transmit a simulated message from the global manager cloud, the simulated message programmed to mirror the TaaS message transmitted on a TaaS link from the external service cloud to the on-vehicle modem;

determine, after the simulated message is received in an autonomous vehicle system, a confidence threshold for a capability or security of the TaaS link by eliminating one or more health conditions associated with a TaaS communication link based on a traversal by the simulated message;

validate, by the on-vehicle modem, AV service data sent from the global manager cloud to the TaaS component of the on-vehicle black box of the autonomous vehicle system;

validate, by the on-vehicle modem, AV compute data sent from the autonomous vehicle system to the TaaS component in the on-vehicle black box;

validate, by the autonomous vehicle system, TaaS message data received from the external service cloud, wherein validating is based on the confirmation data included in the TaaS message data from the initiating message; and update the TaaS component in the autonomous vehicle system based on a problem in the TaaS component of the on-vehicle black box.

12. The cloud and autonomous vehicle compute testing system of claim 11, wherein the one or more processors are further programmed and/or configured to determine the confidence threshold by:

determining that a communication interface is causing issues in the TaaS component comprising signal interference, signal jitter, signal timing, message integrity, configuration issues, or environmental concerns; and controlling the on-vehicle black box to send a valid updated message.

13. The cloud and autonomous vehicle compute testing system of claim 11, wherein the TaaS component comprises at least one of a diagnostic service, location service, fleet service, routing service, device service, user experience service, or telematics service.

14. The cloud and autonomous vehicle compute testing system of claim 11, wherein the external service cloud information is hidden or secret while transmitting between the external service cloud and the on-vehicle black box, and wherein validating TaaS message data comprises at least one of: comparing confirmation data to confirmation data sent to the external service cloud in the initiating message, displaying the confirmation data to a diagnostic display device, displaying the confirmation data in a device of the autonomous vehicle system during a testing procedure, automatically logging non-conforming confirmation data, or automatically comparing confirmation data to the initiating message and transmitting a signal when the confirmation data does not conform.

15. The cloud and autonomous vehicle compute testing system of claim 11, wherein the one or more processors are further programmed and/or configured to update the TaaS component by debugging one or more software bugs, one or more hardware malfunctions, or one or more networking issues inside of one or more external service clouds or one or more on-vehicle cloud systems.

16. The cloud and autonomous vehicle compute testing system of claim 15, wherein validating the on-vehicle TaaS component comprises:

displaying test data on an external situational awareness module, including route information provided by the global manager cloud, passenger fare information from the external service cloud, and real-time sensor information from the autonomous vehicle system, wherein the test data provides confirmation of message content from the global manager cloud, the external service cloud, and the autonomous vehicle system.

17. The cloud and autonomous vehicle compute testing system of claim 16, wherein the on-vehicle modem comprises a TaaS gateway for receiving, routing, and testing TaaS messages, the TaaS gateway comprising a software extension, software injection, or customized software library, including instructions executable in the TaaS gateway when matching with an indication of an incoming TaaS message, instructions programmed to perform an action, to send a message, or perform a remote command back to the external service cloud or global manager cloud, wherein the TaaS gateway automatically executes instructions and transfers diagnostic information for a received TaaS message including vehicle metrics, communication metrics, sensor metrics, or travel information.

18. The cloud and autonomous vehicle compute testing system of claim 17, wherein the on-vehicle modem receives a TaaS message to control the TaaS gateway to handle the TaaS message, wherein the on-vehicle modem may generate or transmit a message to the global manager cloud indicating to perform predictive diagnostics processing on one or more messages sent to a vehicle fleet after aggregating messages across a fleet associated with a specific software bug and/or known issue, and further wherein response the on-vehicle modem receives a diagnostic message including instructions created by the global manager cloud or external service cloud to trigger one or more processors of the TaaS gateway for creation or execution of a specific injection rule associated with the TaaS message.

19. The cloud and autonomous vehicle compute testing system of claim 17, wherein the TaaS gateway transmits a TaaS outgoing message to other vehicles or global manager cloud when a potential diagnostic problem for a certain device occurs based on a specified condition, including at least one of a certain geographical location, a specified time, a specified vehicle condition, a specified network, and wherein transmitting the TaaS outgoing message comprises:

notifying other vehicles that there are potential diagnostic problem for the certain device that occurs at the certain geographical location, or when the confidence threshold reaches a predetermined level;

generating the message or command based on received information; and transmitting the message or command to the global manager cloud that is configured to act on the message, or alternatively, to transmit the message directly to the autonomous vehicle system, an edge processor for diagnosing the TaaS component, or an external service cloud.

20. A computer program product for cloud and autonomous vehicle compute testing, comprising at least one non-transitory computer-readable medium including one or more instructions that, when executed by at least one processor, cause the one or more processors to:

transmit an initiating message from a global manager cloud to an external service cloud to invoke a transportation as a service (TaaS) message provided by the external service cloud via a TaaS link to an on-vehicle modem, comprising confirmation data of the global manager cloud that can be included in the TaaS message as a part of a TaaS update to a TaaS component of an on-vehicle black-box processor;

transmit a simulated message from the global manager cloud, the simulated message programmed to mirror the TaaS message transmitted on the TaaS link from the external service cloud to the on-vehicle modem;

determine, after the simulated message is received in the autonomous vehicle system, a confidence threshold for a capability or security of the TaaS link by eliminating one or more health conditions associated with a TaaS communication link based on a traversal by the simulated message;

validate, by the on-vehicle modem, AV service data sent from the global manager cloud to the TaaS component of the on-vehicle black box of the autonomous vehicle system;

validate, by the on-vehicle modem, AV compute data sent from the autonomous vehicle system to the TaaS component in the on-vehicle black box;

validate, by the autonomous vehicle system, TaaS message data received from the external service cloud, wherein validating is based on the confirmation data included in the TaaS message data from the initiating message; and update, the TaaS component in the autonomous vehicle system based on a problem in the TaaS component of the on-vehicle black box.

* * * * *